United States Patent
Hosaka et al.

(10) Patent No.: US 10,386,681 B2
(45) Date of Patent: Aug. 20, 2019

(54) LIQUID CRYSTAL DISPLAY ELEMENT

(71) Applicants: NISSAN CHEMICAL INDUSTRIES, LTD., Chiyoda-ku (JP); KYUSYU NANOTEC OPTICS CO. LTD., Hayami-gun (JP)

(72) Inventors: Kazuyoshi Hosaka, Funabashi (JP); Noritoshi Miki, Funabashi (JP); Hiroyuki Omura, Funabashi (JP); Jun Hashimoto, Funabashi (JP); Junichi Baba, Hayami-gun (JP); Shota Yoshida, Hayami-gun (JP)

(73) Assignees: Nissan Chemical Industries, Ltd., Chiyoda-ku (JP); Kyusyu Nanotec Optics Co. Ltd., Hayami-gun (JP)

( * ) Notice: Subject to any disclaimer, the term of this patent is extended or adjusted under 35 U.S.C. 154(b) by 0 days.

(21) Appl. No.: 15/320,794

(22) PCT Filed: Jun. 24, 2015

(86) PCT No.: PCT/JP2015/068244
§ 371 (c)(1),
(2) Date: Feb. 9, 2017

(87) PCT Pub. No.: WO2015/199148
PCT Pub. Date: Dec. 30, 2015

(65) Prior Publication Data
US 2017/0199434 A1  Jul. 13, 2017

(30) Foreign Application Priority Data
Jun. 25, 2014  (JP) .................................. 2014-130409

(51) Int. Cl.
*G02F 1/1337* (2006.01)
*C08F 2/44* (2006.01)
(Continued)

(52) U.S. Cl.
CPC .......... *G02F 1/133723* (2013.01); *C08F 2/44* (2013.01); *C08G 73/10* (2013.01);
(Continued)

(58) Field of Classification Search
CPC ......... G02F 1/133732; G02F 1/133365; G02F 1/1334; G02F 1/133788;
(Continued)

(56) References Cited

U.S. PATENT DOCUMENTS

2012/0162596 A1* 6/2012 Chen ................. G02F 1/133703
349/199

FOREIGN PATENT DOCUMENTS

JP  07-05440     * 10/1995
JP  2885116 B2   2/1999
(Continued)

OTHER PUBLICATIONS

International Search Report dated Sep. 8, 2015 in PCT/JP2015/068244.

*Primary Examiner* — Ruiyun Zhang
(74) *Attorney, Agent, or Firm* — Oblon, McClelland, Maier & Neustadt, L.L.P.

(57) ABSTRACT

A liquid crystal display device, containing: a pair of substrates provided with an electrode and a liquid crystal layer formed by disposing a liquid crystal composition between the pair of substrates and by irradiating and curing the liquid crystal composition with ultraviolet rays using an ultraviolet irradiation apparatus, wherein at least one of the substrates is further provided with a liquid crystal alignment film to vertically align a liquid crystal, the liquid crystal composition contains a liquid crystal, a curable resin, a bifunctional monomer and a monomer having at least one polar group of a hydroxy group, a carboxy group or a phosphoric acid group, and the liquid crystal alignment film is a liquid crystal
(Continued)

alignment film obtained from a liquid crystal aligning agent containing a polymer having a specific side chain structure.

26 Claims, 1 Drawing Sheet

(51) Int. Cl.
|  |  |
| --- | --- |
| *C08G 73/10* | (2006.01) |
| *C08G 77/04* | (2006.01) |
| *G02F 1/1334* | (2006.01) |
| *C08G 73/12* | (2006.01) |
| *C08G 77/18* | (2006.01) |
| *C09K 19/38* | (2006.01) |
| *C09K 19/56* | (2006.01) |
| *G02F 1/1333* | (2006.01) |

(52) U.S. Cl.
CPC ......... *C08G 73/1042* (2013.01); *C08G 73/12* (2013.01); *C08G 77/04* (2013.01); *C08G 77/18* (2013.01); *C09K 19/3852* (2013.01); *C09K 19/3861* (2013.01); *C09K 19/56* (2013.01); *G02F 1/1334* (2013.01); *G02F 1/133365* (2013.01); *G02F 1/133788* (2013.01); *G02F 2001/13347* (2013.01); *G02F 2001/133742* (2013.01); *Y10T 428/10* (2015.01); *Y10T 428/1005* (2015.01)

(58) Field of Classification Search
CPC .... G02F 2001/133742; C08G 73/1042; C08G 73/12; C09K 19/56; C09K 19/3852; C09K 19/3861; Y10T 428/10; Y10T 428/1005; Y10T 428/1023
USPC ........ 428/1.1, 1.2, 1.25, 1.26; 349/123, 127, 349/130; 252/299.01
See application file for complete search history.

(56) References Cited

FOREIGN PATENT DOCUMENTS

| JP | 2001004986 A | * | 1/2001 | |
| --- | --- | --- | --- | --- |
| JP | 4132424 B2 | | 6/2008 | |
| WO | WO-2011132751 A1 | * | 10/2011 | ......... C08G 73/1042 |
| WO | WO 2014/084309 A1 | | 6/2014 | |
| WO | WO 2014/103039 A1 | | 7/2014 | |

* cited by examiner

LIQUID CRYSTAL DISPLAY ELEMENT

TECHNICAL FIELD

The present invention relates to a transmission/scattering type liquid crystal display device which is in a transparent state when no voltage is applied and in a scattering state when a voltage is applied.

BACKGROUND ART

A liquid crystal display device employing a liquid crystal material, a TN (twisted nematic) mode liquid crystal display device is in practical use. In such a mode, light switching is carried out employing optical rotation property of a liquid crystal, and a liquid crystal display device in this mode requires use of a polarizing plate. However, use of a polarizing plate lowers the light utilization efficiency.

As a liquid crystal display device which achieves a high light utilization efficiency without using a polarizing plate, a liquid crystal display device in which switching is conducted between a transmission state (also called a transparent state) and a scattering state of a liquid crystal may be mentioned, and a liquid crystal display device employing a polymer dispersed liquid crystal (PDLC) or a polymer network liquid crystal (PNLC) is commonly known.

A liquid crystal display device employing such a liquid crystal is a liquid crystal display device comprising a liquid crystal layer between a pair of substrates provided with an electrode, formed via a step of disposing a liquid crystal composition containing a polymerizable compound which undergoes polymerization by ultraviolet rays between the pair of substrates and curing the liquid crystal composition in such a state that the liquid crystal composition partly or entirely shows liquid crystallinity, to form the liquid crystal layer, that is, a cured product composite (for example, a polymer network) of a liquid crystal and the polymerizable compound. And, in such a liquid crystal display device, the transmission state and the scattering state of the liquid crystal are controlled by voltage application.

A conventional liquid crystal display device employing PDLC or PNLC is in a cloudy (scattering) state when no voltage is applied since liquid crystal molecules are randomly aligned, and is in a transmission state when a voltage is applied since liquid crystal molecules are aligned in an electric field direction, whereby light is transmitted (such a liquid crystal display device controlling the transmission and scattering is also called a normal device). However, in a normal device, it is necessary to always apply a voltage in order to obtain a transmission state, and accordingly when it is used for an application which is mainly used in a transparent state, for example, when used for window glass, the electrical power consumption tends to be large.

Contrary to the normal device, a reverse liquid crystal display device employing PDLC, which is in a transmission state when no voltage is applied and is in a scattering state when a voltage is applied (also called a reverse device) has been reported (Patent Documents 1 and 2).

PRIOR ART DOCUMENTS

Patent Documents

Patent Document 1: Japanese Patent No. 2885116
Patent Document 2: Japanese Patent No. 4132424

DISCLOSURE OF INVENTION

Technical Problem

For a conventional reverse device employing PDLC or PNLC, a liquid crystal alignment film to vertically align a liquid crystal (also called a vertical liquid crystal alignment film) is used since it is necessary to vertically align a liquid crystal. Since a vertical liquid crystal alignment film is a highly hydrophobic film, the adhesion of the liquid crystal alignment film to a liquid crystal layer tends to be low. Therefore, for a liquid crystal composition used for the reverse device, a curing agent to increase the adhesion between the liquid crystal layer and the liquid crystal alignment film should be incorporated in a large amount. However, if a curing agent is incorporated in a large amount, the vertical alignment property of the liquid crystal tends to be impaired, and the transparency when no voltage is applied and scattering property when a voltage is applied tend to be significantly decreased. Therefore, a liquid crystal alignment film used for a reverse device is required to have high vertical alignment property of the liquid crystal.

In addition, the liquid crystal composition, particularly the polymerizable compound in the liquid crystal composition has a role to form a polymer network thereby to achieve desired optical properties. However, this polymerizable compound also has a role as the above curing agent, and from the above reason, the polymerizable compound is required to have an effect to more efficiently improve the adhesion to the vertical liquid crystal alignment film even with a small amount.

Under these circumstances, the object of the present invention is to provide a liquid crystal display device which has all of the above properties. That is, the object of the present invention is to provide a liquid crystal display device in which favorable optical properties, that is, favorable transparency when no voltage is applied and favorable scattering property when a voltage is applied are achieved, and the adhesion between the liquid crystal layer and the vertical liquid crystal alignment film is high. Specifically, the object is to provide a liquid crystal display device obtained by employing a liquid crystal composition which improves the adhesion between the liquid crystal layer and the liquid crystal alignment film, and further, employing a vertical liquid crystal alignment film having high vertical alignment property of the liquid crystal and having high adhesion to the liquid crystal layer.

Solution to Problem

The present inventors have conducted extensive studies, and as a result, found that a liquid crystal display device employing a liquid crystal composition containing a specific compound and a vertical liquid crystal alignment film obtained from a liquid crystal aligning agent containing a polymer having a side chain with a specific structure, is very effective to achieve the above object, and accomplished the present invention.

That is, the present invention provides a liquid crystal display device, which comprises a liquid crystal layer formed by disposing a liquid crystal composition between a pair of substrates provided with an electrode and irradiating the liquid crystal composition with ultraviolet rays and curing it by an ultraviolet irradiation apparatus in such a state that the liquid crystal composition partly or entirely shows liquid crystallinity, and at least one of the substrates being provided with a liquid crystal alignment film to vertically align a liquid crystal, wherein the liquid crystal composition contains a liquid crystal, a curable resin, a bifunctional monomer and a monomer having at least one polar group selected from the group consisting of a hydroxy group, a carboxy group and a phosphoric acid group, and the liquid crystal alignment film is a liquid crystal alignment film obtained from a liquid crystal aligning agent containing a polymer having a structure represented by the following formula [1-1] or [1-2]:

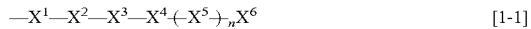
[1-1]

wherein $X^1$ and $X^3$ are each independently at least one binding group selected from the group consisting of a single bond, $—(CH_2)_a—$ (wherein a is an integer of from 1 to 15), $—O—$, $—CH_2O—$, $—COO—$ and $—OCO—$; $X^2$ is a single bond or $—(CH_2)_b—$ (wherein b is an integer of from 1 to 15); $X^4$ is at least one bivalent cyclic group selected from the group consisting of a benzene ring, a cyclohexane ring and a heterocyclic ring, or a $C_{17-51}$ bivalent organic group having a steroid skeleton, provided that an optional hydrogen atom on the cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom; $X^5$ is at least one cyclic group selected from the group consisting of a benzene ring, a cyclohexane ring and a heterocyclic ring, provided that an optional hydrogen atom on such a cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom; n is an integer of from 0 to 4; and $X^6$ is at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group;

[1-2]

wherein $X^7$ is at least one binding group selected from the group consisting of a single bond, $—O—$, $—CH_2O—$, $—CONH—$, $—NHCO—$, $—CON(CH_3)—$, $—N(CH_3)CO—$, $—COO—$ and $—OCO—$; and $X^8$ is a $C_{8-22}$ alkyl group or a $C_{6-18}$ fluorine-containing alkyl group.

Advantageous Effects of Invention

According to the present invention, it is possible to provide a reverse liquid crystal display device in which favorable optical properties, that is, favorable transparency when no voltage is applied and favorable scattering property when a voltage is applied are achieved, and the adhesion between the liquid crystal layer and the vertical liquid crystal alignment film is high. The liquid crystal display device of the present invention is useful for e.g. a liquid crystal display used for display, a light control window or an optical shutter device controlling transmission and blocking of light.

The monomer having a polar group used for preparation of the liquid crystal display device of the present invention can improve the adhesion between the liquid crystal layer and the vertical liquid crystal alignment film by an interaction of the polar group and the vertical liquid crystal alignment film.

Further, the vertical liquid crystal alignment film used for preparation of the liquid crystal display device of the present invention is obtained from a liquid crystal aligning agent containing a polymer having a structure of the above formula [1-1] or [1-2](hereinafter sometimes referred to as a specific side chain structure). Particularly, since the specific side chain structure of the formula [1-1] is a rigid structure, in a liquid crystal display device employing a vertical liquid crystal alignment film with such a specific side chain structure, highly stable vertical alignment property of the liquid crystal is achieved. Further, high vertical alignment property can be achieved by the specific side chain structure even with a small amount. Accordingly, in a liquid crystal display device obtained by employing a vertical liquid crystal alignment film having the specific side chain structure, the adhesion between the liquid crystal layer and the vertical liquid crystal alignment film is higher.

Accordingly, the liquid crystal display device of the present invention comprising a liquid crystal layer formed from a liquid crystal composition containing a specific compound and a vertical liquid crystal alignment film obtained from a liquid crystal aligning agent containing a polymer having a specific side chain structure, is a liquid crystal display device in which favorable optical properties, that is, favorable transparency when no voltage is applied and favorable scattering property when a voltage is applied are achieved, and the adhesion between the liquid crystal layer and the vertical liquid crystal alignment film is high.

DESCRIPTION OF EMBODIMENTS

<Liquid Crystal Composition>

Figure 1:
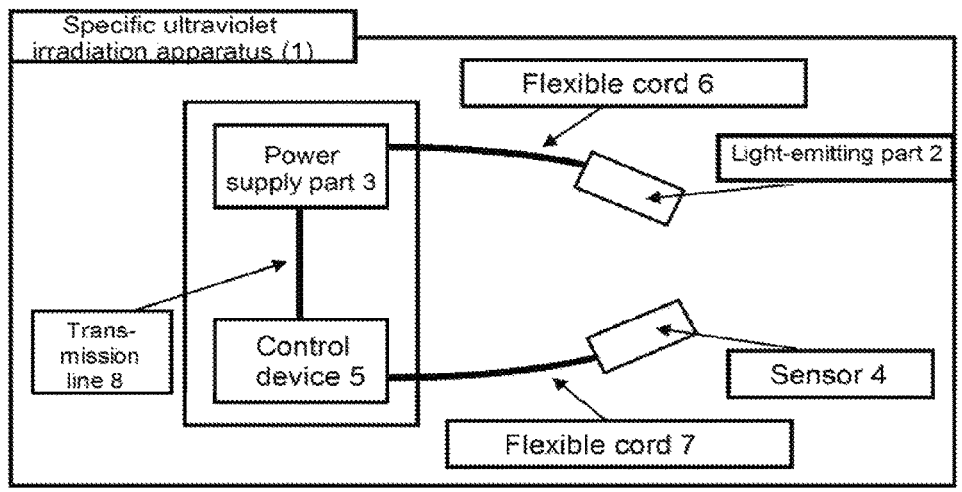
FIG. 1 is a view illustrating a specific ultraviolet irradiation apparatus (1) in the present invention.

The liquid crystal composition in the present invention contains a liquid crystal, a curable resin, a bifunctional monomer, and a monomer having at least one polar group selected from the group consisting of a hydroxy group, a carboxy group and phosphoric acid group.

As the liquid crystal, a nematic liquid crystal, a smectic liquid crystal or a cholestric liquid crystal may be used. Among them, preferred is one having a negative dielectric anisotropy. Further, in view of low voltage drive and scattering property, preferred is one having a large dielectric constant anisotropy and a large refractive index anisotropy. Specifically, the dielectric constant anisotropy (Δs) is preferably from −1 to −10, more preferably from −3 to −6. Further, the refractive index anisotropy (Δn) is preferably from 0.150 to 0.350, more preferably from 0.150 to 0.250. Further, the phase transition temperature of the liquid crystal is preferably from 40 to 120° C., more preferably from 80 to 100° C.

Further, the liquid crystal may be used as a mixture of two or more types of liquid crystal, depending upon physical property values of the phase transition temperature, the dielectric constant anisotropy and the refractive index anisotropy.

In order that the liquid crystal display device is operated as an active device such as a thin film transistor (TFT), the liquid crystal is required to have a high electrical resistance and a high voltage holding ratio (hereinafter sometimes referred to as VHR). Accordingly, it is preferred to use as the liquid crystal a fluorine-type or chlorine-type liquid crystal which has a high electrical resistance and of which VHR is not decreased by active energy rays such as ultraviolet rays.

Further, for the liquid crystal display device, a dichroic dye may be dissolved in the liquid crystal composition to constitute a guest host device. In such a case, a device is obtained which is in a transparent state when no voltage is applied and which is in an absorption (scattering) state when a voltage is applied. Further, in such a liquid crystal display device, the director (direction of alignment) of the liquid crystal changes by 90 degree depending upon application/non-application of a voltage. Accordingly, with such a liquid crystal display device, a high contrast can be obtained utilizing differences of light absorption properties of the dichroic dye, as compared with a conventional guest host device in which switching is conducted between random alignment and vertical alignment. Further, with respect to a guest host device in which a dichroic dye is dissolved, the device is colored when the liquid crystal is aligned in a horizontal direction and is opaque only in a scattering state. Accordingly, it is possible to obtain a device which shifts from a colorless and transparent state when no voltage is applied to a colored opaque state and a colored transparent state along with application of a voltage.

With respect to the curable resin, a polymerizable compound may be introduced in the liquid crystal composition and is let to undergo a polymerization reaction by irradiation with ultraviolet rays at the time of preparation of the liquid crystal device, to form a curable resin (also called a polymer network), or a polymer preliminarily obtained by polymerizing a polymerizable compound may be introduced to the liquid crystal composition. However, in the case of the polymer, the polymer is required to have a moiety which undergoes a polymerization reaction by irradiation with ultraviolet rays. More preferred is a method of introducing a polymerizable compound to the liquid crystal composition and subjecting the polymerizable compound to a polymerization reaction by irradiation with ultraviolet rays at the time of preparation of the liquid crystal display device, to form a curable resin, in view of handling efficiency of the liquid crystal composition, that is, with a view to suppressing an increase of the viscosity of the liquid crystal composition and in view of the solubility in the liquid crystal.

The polymerizable compound in the liquid crystal composition is not particularly limited so long as it is soluble in the liquid crystal, but it is required that when the polymerizable compound is dissolved in the liquid crystal, there is a temperature at which the liquid crystal composition partly or entirely shows a liquid crystalline phase. In a case where the liquid crystal composition partly shows a liquid crystalline phase, the entire liquid crystal display device should show substantially uniform transparency and scattering property when visually observed.

The polymerizable compound is not limited so long as it is a compound which undergoes a polymerization reaction by ultraviolet rays, and on that occasion, the reaction mode of the polymerization is not limited so long as a curable resin (also called a polymer network) is formed. As a specific reaction mode, radical polymerization, cationic polymerization, anionic polymerization or addition polymerization may be mentioned.

Among them, the reaction mode of the polymerization of the polymerizable compound is preferably radical polymerization. On that occasion, as the polymerizable compound, the following radical-type polymerizable compound or its oligomer may be used. Further, as described above, a polymer obtained by polymerizing such a polymerizable compound may also be used.

As a monofunctional polymerizable compound, for example, 2-ethylhexyl acrylate, butylethyl acrylate, butoxyethyl acrylate, 2-cyanoethyl acrylate, benzyl acrylate, cyclohexyl acrylate, hydroxyethyl acrylate, 2-hydroxypropyl acrylate, 2-ethoxyethyl acrylate, N,N-diethylaminoethyl acrylate, N,N-dimethylaminoethyl acrylate, dicyclopentanyl acrylate, dicyclopentenyl acrylate, diglycidyl acrylate, tetrahydrofurfuryl acrylate, isobornyl acrylate, isodecyl acrylate, lauryl acrylate, morpholine acrylate, phenoxyethyl acrylate, phenoxydiethylene glycol acrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2-ethylhexyl methacrylate, butylethyl methacrylate, butoxyethyl methacrylate, 2-cyanoethyl methacrylate, benzyl methacrylate, cyclohexyl methacrylate, hydroxyethyl methacrylate, 2-hydroxypropyl methacrylate, 2-ethoxyethyl acrylate, N,N-diethylaminoethyl methacrylate, N,N-dimethylaminoethyl methacrylate, dicyclopentanyl methacrylate, dicyclopentenyl methacrylate, glycidyl methacrylate, tetrahydrofurfuryl methacrylate, isobornyl methacrylate, isodecyl methacrylate, lauryl methacrylate, morpholine methacrylate, phenoxyethyl methacrylate, phenoxydiethylene glycol methacrylate, 2,2,2-trifluoroethyl methacrylate, 2,2,3,3-tetrafluoropropyl methacrylate, 2,2,3,4,4,4-hexafluorobutyl methacrylate or an oligomer thereof may be mentioned.

As a bifunctional polymerizable compound, for example, 4,4'-diacryloyloxystilbene, 4,4'-diacryloyloxydimethylstilbene, 4,4'-diacryloyloxydiethylstilbene, 4,4'-diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol-1,5-diacrylate, 1,1,2,2,3,3-hexafluoropropyl-1,3-diacrylate, diethylene glycol dimethacrylate, 1,4-butanediol dimethacrylate, 1,3-butylene glycol dimethacrylate, 1,6-hexanediol dimethacrylate, neopentylglycol dimethacrylate, tetraethylene glycol dimethacrylate, 4,4'-biphenyl diacrylate, diethylstilbestrol diacrylate, 1,4-bisacryloyloxybenzene, 4,4'-bisacryloyloxydiphenyl ether, 4,4'-bisacryloyloxydiphenylmethane, 3,9-[1,1-dimethyl-2-acryloyloxyethyl]-2,4,8,10-tetraspiro[5,5]undecane, α,α'-bis[4-acryloyloxyphenyl]-1,4-diisopropylbenzene, 1,4-bisacryloyloxytetrafluorobenzene, 4,4'-bisacryloyloxyoctafluorobiphenyl, diethylene glycol acrylate, 1,4-butandiol diacrylate, 1,3-butylene glycol diacrylate, dicyclopentanyl diacrylate, glycerol diacrylate, 1,6-hexanediol diacrylate, neopentyl glycol diacrylate, tetraethylene glycol diacrylate, 1,9-nonanediol diacrylate, polyethylene glycol diacrylate, polypropylene glycol diacrylate, 1,9-nonanediol dimethacrylate, polyethylene glycol dimethacrylate, polypropylene glycol dimethacrylate or an oligomer thereof may be mentioned.

As a multifunctional polymerizable compound, for example, trimethylolpropane triacrylate, pentaerythritol tetraacrylate, pentaerythritol triacrylate, ditrimethylolpropane tetraacrylate, dipentaerythritol hexaacrylate, dipentaerythritol monohydroxypentaacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxypentamethacrylate, 2,2,3,3,4,4-hexafluoropentanediol-1,5-dimethacrylate or an oligomer thereof may be mentioned.

Further, a multifunctional thiol compound such as pentaerythritol tetrakis(3-mercaptobutyrate), 1,4-bis(3-mercaptobutyryloxy)butane, 1,3,5-tris(3-mercaptobutyryloxyethyl)-1,3,5-triazin-2,4,6(1H,3H,5H)-trione, trimethylolpropanetris(3-mercaptobutyrate) or trimethylolethane tris(3-mercaptobutyrate) or an oligomer thereof may also be used. In the present invention, such a compound is preferably used, and among them, a multifunctional thiol compound is preferably used. In such a case, the amount of the multifunctional thiol compound is preferably from 0.1 to 100 parts by mass, more preferably from 1 to 50 parts by mass per 100 parts by mass of the entire liquid crystal. It is particularly preferably from 5 to 40 parts by mass.

Further, it is possible to use a polyurethane acrylate such as a phenyl glycidyl ether acrylate hexamethylene diisocyanate urethane prepolymer, a pentaerythritol triacrylate hexamethylene diisocyanate urethane prepolymer or a dipentaerythritol pentaacrylate hexamethylene diisocyanate urethane prepolymer or a monomer or an oligomer thereof.

Such a radical-type polymerizable compound may be used alone or in combination of two or more depending upon optical properties of the obtainable liquid crystal display device, the adhesion between the liquid crystal layer and the vertical liquid crystal alignment film, etc.

In order to promote formation of the curable resin, it is preferred to incorporate, in the liquid crystal composition, for the purpose of promoting radical polymerization of the polymerizable compound, a radical initiator (hereinafter sometimes referred to as a polymerization initiator) which generates radicals by ultraviolet rays. For example, an organic peroxide such as tert-butylperoxy-iso-butyrate, 2,5-dimethyl-2,5-bis(benzoyldioxy)hexane, 1,4-bis[α-(tert-butyldioxy)-iso-propoxy]benzene, di-tert-butyl peroxide, 2,5-dimethyl-2,5-bis(tert-butyldioxy)hexene hydroperoxide, α-(iso-propylphenyl)-iso-propyl hydroperoxide, 2,5-dimethylhexane, tert-butyl hydroperoxide, 1,1-bis(tert-butyldioxy)-3,3,5-trimethylcyclohexane, butyl-4,4-bis(tert-butyldioxy)valerate, cyclohexanone peroxide, 2,2',5,5'-tetra(tert-butylperoxycarbonyl)benzophenone, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3'-bis(tert-butylperoxycarbonyl)-4,4'-dicarboxybenzophenone, tert-butyl peroxybenzoate or di-tert-butyldiperoxy isophthalate, a quinone such as 9,10-anthraquinone, 1-chloroanthraquinone, 2-chloroanthraquinone, octamethylanthraquinone or 1,2-benzanthraquinone, or a benzoin derivative such as benzoin methyl, benzoin ethyl ether, α-methyl benzoin or α-phenyl benzoin may be mentioned.

Such a radical initiator may be used alone or in combination of two or more depending upon optical properties of the obtainable liquid crystal display device, the adhesion between the liquid crystal layer and the vertical liquid crystal alignment film, etc.

The monomer having at least one polar group selected from the group consisting of a hydroxy group, a carboxy group and a phosphoric acid group is particularly preferably a monomer having a phosphoric acid group. Specifically, for example, triphenyl phosphite, trisnonylphenyl phosphite, tricresyl phosphite or tetraphenyl dipropylene glycol diphosphite may be mentioned. Among them, an organic phosphoric acid compound is preferred, with a view to uniformly conducting radical polymerization of the polymerizable compound and in view of the adhesion to the vertical liquid crystal alignment film.

As the curable resin of the present invention, it is preferred to use at least one member selected from the group consisting of an aliphatic urethane acrylate, an aliphatic urethane methacrylate, isobornyl acrylate, isobornyl methacrylate, an acrylate ester, a methacrylate ester, hydroxyethyl acrylate, hydroxyethyl methacrylate, 2-hydroxypropyl acrylate and 2-hydroxypropyl methacrylate. Further, an oligomer thereof may be used. It is more preferred to use an aliphatic urethane acrylate, isobornyl acrylate, an acrylate ester or hydroxyethyl methacrylate. It is preferred to incorporate the above polymerization initiator to the curable resin so as to promote the radical reaction of the polymerizable compound.

With respect to the ratio of the curable resin and the organic phosphoric acid compound, based on the entire amount of the mixture of the curable resin and the organic phosphoric acid compound, the proportion of the aliphatic urethane acrylate is from 30 to 40 mass %, the proportion of isobornyl acrylate is from 30 to 40 mass %, the proportion of the acrylate ester is from 1 to 10 mass %, the proportion of the hydroxyethyl methacrylate is from 1 to 10 mass %, the proportion of the polymerization initiator is from 1 to 10 mass %, and the proportion of the organic phosphoric acid compound is from 1 to 3 mass %.

As the bifunctional monomer, the above bifunctional polymerizable compound may be mentioned. Among them, it is preferred to use 1,9-nonanediol diacrylate, 1,9-nonanediol methacrylate, polyethylene glycol diacrylate, polyethylene glycol dimethacrylate, polypropylene glycol diacrylate or polypropylene glycol dimethacrylate. More preferred is 1,9-nonanediol diacrylate or 1,9-nonanediol methacrylate.

The mass ratio of the mixture (the mixture of the curable resin and the organic phosphoric acid compound) to the bifunctional monomer (the mixture:the bifunctional monomer) is preferably from 10:90 to 90:10, more preferably from 40:60 to 60:40, further preferably from 50:50.

Further, the mass ratio of a mixture of the above mixture and the bifunctional monomer to the liquid crystal material (a mixture of the above mixture and the bifunctional monomer:the liquid crystal material) is preferably 10:90, more preferably from 30:70 to 40:60, further preferably 35:65.

<Liquid Crystal Aligning Agent>

The vertical liquid crystal alignment film in the present invention is obtained from a liquid crystal aligning agent containing a polymer having a specific side chain structure of the following formula [1-1] or [1-2] (hereinafter sometimes referred to as a specific polymer in the present invention):

$$-X^1-X^2-X^3-X^4-(X^5)_n-X^6 \quad [1-1]$$

In the formula, $X^1$, $X^2$, $X^3$, $X^4$, $X^5$, $X^6$ and n are as defined above, and particularly, they are preferably as follows.

$X^1$ is, in view of availability of the material and easiness of preparation, preferably a single bond, $-(CH_2)_a-$ (wherein a is an integer of from 1 to 10), $-O-$, $-CH_2O-$ or $-COO-$.

$X^2$ is preferably a single bond or $-(CH_2)_b-$ (wherein b is an integer of from 1 to 10).

$X^3$ is, in view of easiness of preparation, preferably a single bond, $-(CH_2)_c-$ (wherein c in an integer of from 1 to 15), $-O-$, $-CH_2O-$ or $-COO-$.

$X^4$ is, in view of easiness of preparation, preferably a benzene ring, a cyclohexane ring or a $C_{17-51}$ organic group having a steroid skeleton.

$X^5$ is preferably a benzene ring or a cyclohexane ring.

$X^6$ is preferably a $C_{1-18}$ alkyl group, a $C_{1-10}$ fluorine-containing alkyl group, a $C_{1-18}$ alkoxy group or a $C_{1-10}$ fluorine-containing alkoxy group. It is more preferably a $C_{1-12}$ alkyl group or a $C_{1-12}$ alkoxy group, particularly preferably a $C_{1-9}$ alkyl group or a $C_{1-9}$ alkoxy group.

n is, in view of availability of the material and easiness of preparation, preferably an integer of from 0 to 3, more preferably an integer of from 0 to 2.

As preferred combinations of $X^1$, $X^2$, $X^3$, $X^4$, $X^5$, $X^6$ and n, the same combinations as combinations (2-1) to (2-629) disclosed in WO2011/132751 (published on Oct. 27, 2011), pages 13 to 34, Tables 6 to 47 may be mentioned. In the tables in WO2011/132751, $X^1$ to $X^6$ in the present invention are represented as Y1 to Y6, and Y1 to Y6 should be read as $X^1$ to $X^6$. Further, in (2-605) to (2-629) in tables in WO2011/132751, the $C_{17-51}$ organic group having a steroid skeleton in the present invention is represented as a 012-25 organic group having a steroid skeleton, and the $C_{12-25}$ organic group having a steroid skeleton should be read as a $C_{17-51}$ organic group having a steroid skeleton.

Among them, preferred are combinations (2-25) to (2-96), (2-145) to (2-168), (2-217) to (2-240), (2-268) to (2-315), (2-364) to (2-387), (2-436) to (2-483) and (2-603) to (2-615). Particularly preferred are combinations (2-49) to (2-96), (2-145) to (2-168), (2-217) to (2-240), (2-603) to (2-606), (2-607) to (2-609), (2-611), (2-612) and (2-624).

$$-X^7-X^8 \quad [1\text{-}2]$$

In the formula, $X^7$ and $X^8$ are as defined above. $X^7$ is preferably a single bond, —O—, —CONH— or —COO—.

$X^8$ is preferably a $C_{8-18}$ alkyl group.

The specific side chain structure in the present invention is preferably the specific side chain structure of the formula [1-1] in that a highly stable vertical alignment property of the liquid crystal can be thereby achieved, as described above.

<Specific Polymer>

The polymer having the specific side chain structure is not particularly limited and is preferably at least one polymer selected from the group consisting of an acrylic polymer, a methacrylic polymer, a novolac resin, a polyhydroxystyrene, a polyimide precursor, a polyimide, a polyamide, a polyester, a cellulose and a polysiloxane. Among them, preferred is a polyimide precursor, a polyimide or a polysiloxane.

In a case where a polyimide precursor or a polyimide (they will sometimes be generally referred to as a polyimide-based polymer) is used as the specific polymer, they are preferably a polyimide precursor or a polyimide obtained by reacting a diamine component and a tetracarboxylic acid component.

The polyimide precursor has a structure represented by the following formula [A]:

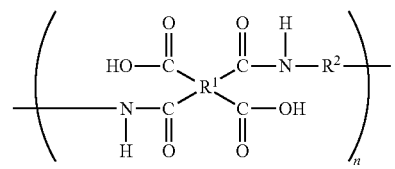

wherein $R^1$ is a tetravalent organic group, $R^2$ is a bivalent organic group, $A^1$ and $A^2$ are each independently a hydrogen atom or a $C_{1-8}$ alkyl group, $A^3$ and $A^4$ are each independently a hydrogen atom, a $C_{1-5}$ alkyl group or an acetyl group, and n is a positive integer.

The diamine component may be a diamine having two primary or secondary amino groups in its molecule. The tetracarboxylic acid component may be a tetracarboxylic acid compound, a tetracarboxylic acid dianhydride, a tetracarboxylic acid dihalide compound, a tetracarboxylic acid dialkyl ester compound or a tetracarboxylic acid dialkyl ester dihalide compound.

The polyimide-based polymer is preferably a polyamide acid having repeating units of the following formula [D] or a polyimide obtained by imidizing the polyamide acid, which is relatively easily obtained from a tetracarboxylic acid dianhydride of the following formula [B] and a diamine of the following formula [C] as materials. Particularly, as the polyimide-based polymer, it is preferred to use a polyimide in view of physical and chemical stability of the obtainable vertical liquid crystal alignment film.

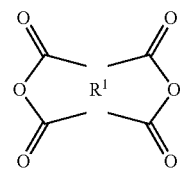

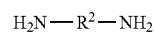

wherein $R^1$ and $R^2$ are as defined for the formula [A];

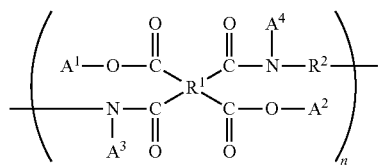

wherein $R^1$ and $R^2$ are as defined for the formula [A].

Further, it is possible to introduce, to the above-obtained polymer of the formula [D], a $C_{1-8}$ alkyl group as each of $A^1$ and $A^2$ in the formula [A], or a $C_{1-5}$ alkyl group or an acetyl group as each of $A^3$ and $A^4$ in the formula [A], by a conventional preparation process.

As a method for introducing the specific side chain structure to the polyimide-based polymer, it is preferred to use a diamine having the specific side chain structure as a part of the material. Particularly, it is preferred to use a diamine of the following formula [1a] (hereinafter sometimes referred to as a specific side chain type diamine):

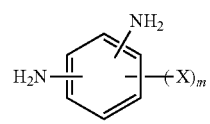

X is a structure of the above formula [1-1] or [1-2].

m is an integer of from 1 to 4. It is preferably an integer of 1.

The specific side chain type diamine is preferably a diamine having a structure of the following formula [1-1a] with a view to obtaining a highly stable vertical alignment property of the liquid crystal.

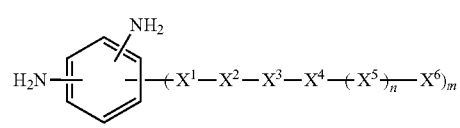

The details and preferred combinations of $X^1$, $X^2$, $X^3$, $X^4$, $X^5$, $X^6$ and n in the formula [1-1a] are as defined for the above formula [1-1].

m is an integer of from 1 to 4. It is preferably 1.

As the diamine of the above formula [1-1a], specifically, diamine compounds of the formulae [2a-1] to [2a-36] disclosed in WO2015/012368 (published on Jan. 29, 2015), pages 17 to 23 may be mentioned.

Among them, diamines of the following formulae [1a-32] to [1a-36] are most preferred, whereby highly stable vertical alignment property of the liquid crystal can be obtained.

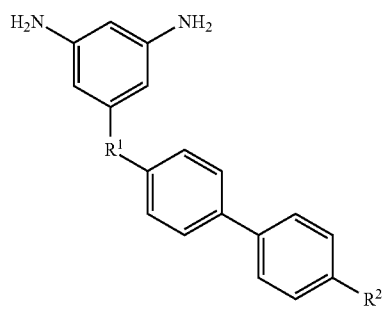
[1a-32]

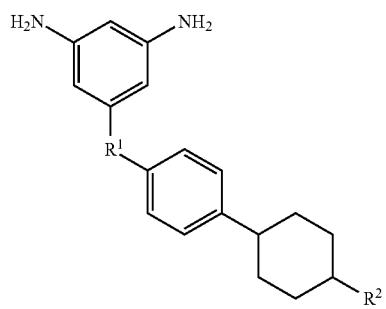
[1a-33]

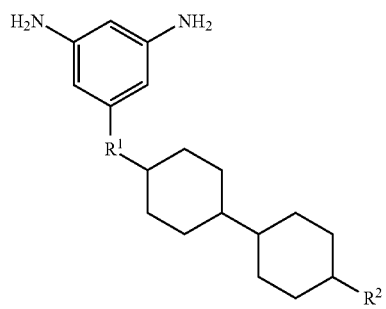
[1a-34]

wherein $R^1$ is —CH$_2$O—, and $R^2$ is each independently a C$_{3-12}$ alkyl group;

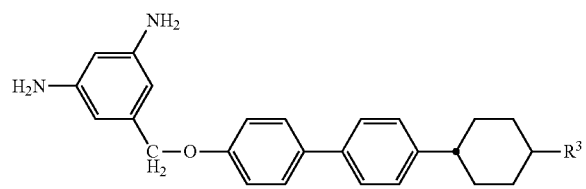
[1a-35]

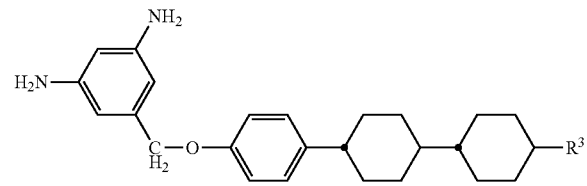
[1a-36]

wherein $R^3$ is each independently a C$_{3-12}$ alkyl group, and regarding the cis-trans isomerism, 1,4-cyclohexylene is a trans isomer.

Further, as a diamine having the specific side chain structure represented by the above formula [1-2], specifically, diamine compounds of the formulae [2a-37] to [2a-46] disclosed in WO2015/012368 (published on Jan. 29, 2015), pages 23 to 24 may be mentioned.

The proportion of the specific side chain type diamine is preferably from 10 to 80 mol %, more preferably from 20 to 70 mol % based on the entire diamine component, in view of the vertical alignment property of the liquid crystal and the adhesion between the liquid crystal layer and the vertical liquid crystal alignment film in the obtainable liquid crystal display device.

Further, the specific side chain type diamine may be used alone or in combination of two or more depending upon the solubility of the polyimide-based polymer in a solvent, the vertical alignment property of the liquid crystal when a vertical liquid crystal alignment film is formed, optical properties of the obtainable liquid crystal display device, etc.

As the diamine component to prepare the polyimide-based polymer, it is preferred to use a diamine of the following formula [2a] (hereinafter sometimes referred to as a second diamine).

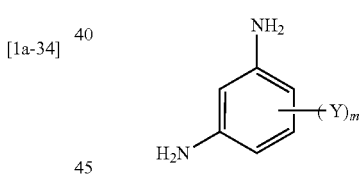
[2a]

Y is at least one substituent selected from the group consisting of the following formulae [2a-1] to [2a-5].

m is an integer of from 1 to 4. It is preferably 1.

[2a-1]

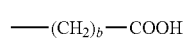
[2a-2]

[2a-3]

[2a-4]

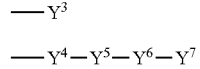
[2a-5]

a is an integer of from 0 to 4, and in view of availability of the material and easiness of preparation, it is preferably an integer of 0 or 1.

b is an integer of from 0 to 4, and in view of availability of the material and easiness of preparation, it is preferably an integer of 0 or 1.

$Y^1$ and $Y^2$ are each independently a $C_{1-12}$ hydrocarbon group.

$Y^3$ is a $C_{1-5}$ alkyl group.

$Y^4$ is at least one binding group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—. Among them, it is preferably a single bond, —O—, —CH$_2$O—, —CONH—, —CON(CH$_3$)— or —COO—. More preferred is a single bond, —O—, —CH$_2$O— or —COO—, in view of easiness of preparation of a specific photo-reactive structure.

$Y^5$ is a $C_{1-18}$ alkylene group or a $C_{6-24}$ organic group having at least one cyclic group selected from the group consisting of a benzene ring, a cyclocyclohexane ring or a heterocyclic ring, provided that an optional hydrogen atom on the cyclic group may be substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom. Among them, preferred is a $C_{2-12}$ alkylene group or a $C_{6-24}$ organic group having at least one cyclic group selected from the group consisting of a benzene ring and a cyclocyclohexane ring. More preferred is a $C_{2-12}$ alkylene group, in view of easiness of preparation of a specific photo-reactive structure, and adhesion between the liquid crystal layer and the vertical liquid crystal alignment film in the obtainable liquid crystal display device.

$Y^6$ is at least one binding group selected from the group consisting of a single bond, —O—, —NH—, —N(CH$_3$)—, —CH$_2$O—, —CONH—, —NHCO—, —CON(CH$_3$)—, —N(CH$_3$)CO—, —COO— and —OCO—.

Among them, preferred is a single bond, —O—, —NHCO—, —N(CH$_3$)CO— or —OCO—. More preferred is a single bond, —O—, —NHCO— or —OCO—, in view of easiness of preparation of a specific photo-reactive structure.

$Y^7$ is at least one structure selected from the group consisting of structures of the following formulae [2b-1] to [2b-7]:

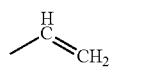
[2b-1]

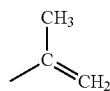
[2b-2]

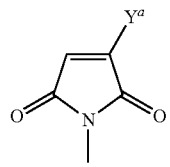
[2b-3]

[2b-4]

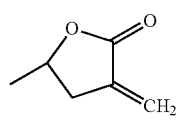
[2b-5]

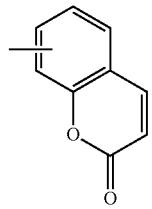
[2b-6]

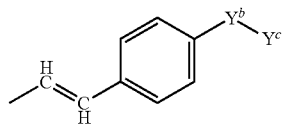
[2b-7]

wherein $Y^a$ is a hydrogen atom or a benzene ring; $Y^b$ is a single bond or at least one cyclic group selected from the group consisting of a benzene ring, a cyclohexane ring and a heterocyclic ring; and $Y^c$ is at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group.

Specific structures of the second diamine of the formula [2a] will be shown below. However, the second diamine is not limited to such specific examples.

That is, as the second diamine, for example, 2,4-dimethyl-m-phenylenediamine, 2,6-diaminotoluene, 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid, 3,5-diaminobenzoic acid and diamines of the following formulae [2-1] to [2-15] may be mentioned.

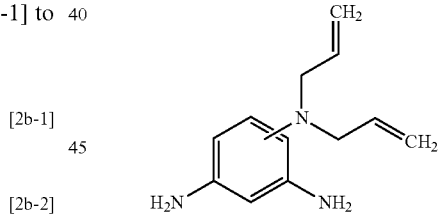
[2-1]

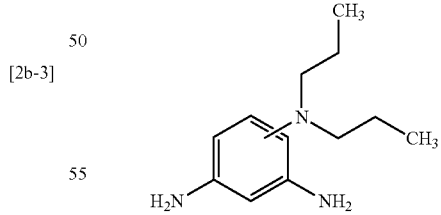
[2-2]

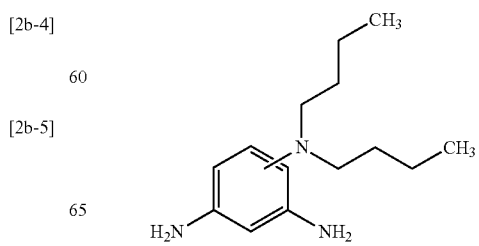
[2-3]

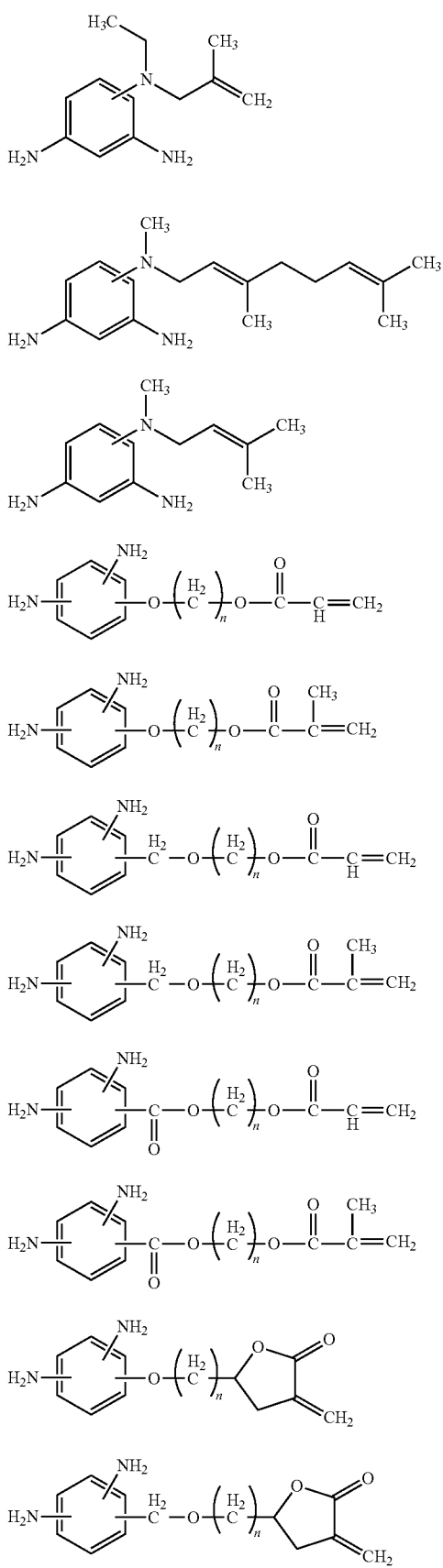

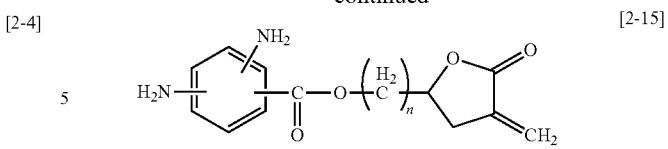

wherein n is each independently an integer of from 2 to 12.

Among them, preferred is 2,4-diaminophenol, 3,5-diaminophenol, 3,5-diaminobenzyl alcohol, 2,4-diaminobenzyl alcohol, 4,6-diaminoresorcinol, 2,4-diaminobenzoic acid, 2,5-diaminobenzoic acid, 3,5-diaminobenzoic acid, or a diamine of the formula [2-1], [2-2], [2-3], [2-7], [2-8], [2-11], [2-12] or [2-15]. Particularly preferred is 2,4-diaminophenol, 3,5-diaminophenol, 3,5-diaminobenzyl alcohol, 3,5-diaminobenzoic acid, or a diamine of the formula [2-1], [2-2], [2-11] or [2-12], in view of the solubility of the polyimide-based polymer in a solvent and optical properties of the obtainable liquid crystal display device.

The second diamine may be used alone or in combination of two or more depending upon the solubility of the polyimide-based polymer in a solvent, the vertical alignment property of the liquid crystal when a vertical liquid crystal alignment film is formed, optical properties of the obtainable liquid crystal display device, etc.

As the diamine component to prepare the polyimide-based polymer, a diamine other than the diamine of the above formula [1a] or [2a] (hereinafter sometimes referred to as other diamine) may be used as the diamine.

Specifically, other diamine compounds disclosed in WO2015/012368 (published on Jan. 29, 2015), pages 27 to 30, and diamine compounds of the formulae [DA1] to [DA14] disclosed in WO2015/012368, pages 30 to 32, may be mentioned. Further, such other diamine may be used alone or in combination of two or more depending upon the properties.

As the tetracarboxylic acid component to prepare the polyimide-based polymer, it is preferred to use a tetracarboxylic acid dianhydride of the following formula [3] or its tetracarboxylic acid derivative i.e. tetracarboxylic acid, a tetracarboxylic acid dihalide compound, a tetracarboxylic acid dialkyl ester compound or a tetracarboxylic acid dialkyl ester dihalide compound (they will sometimes be generally referred to as a specific tetracarboxylic acid component).

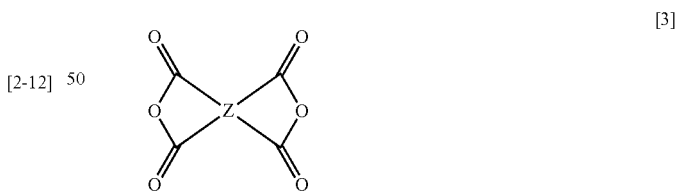

Z is at least one structure selected from the group consisting of structures of the following formulae [3a] to [3k]:

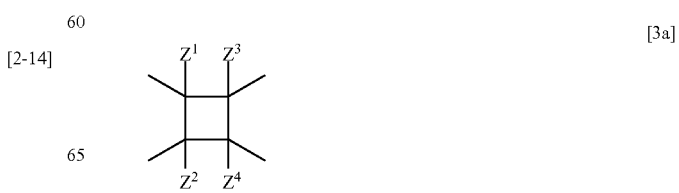

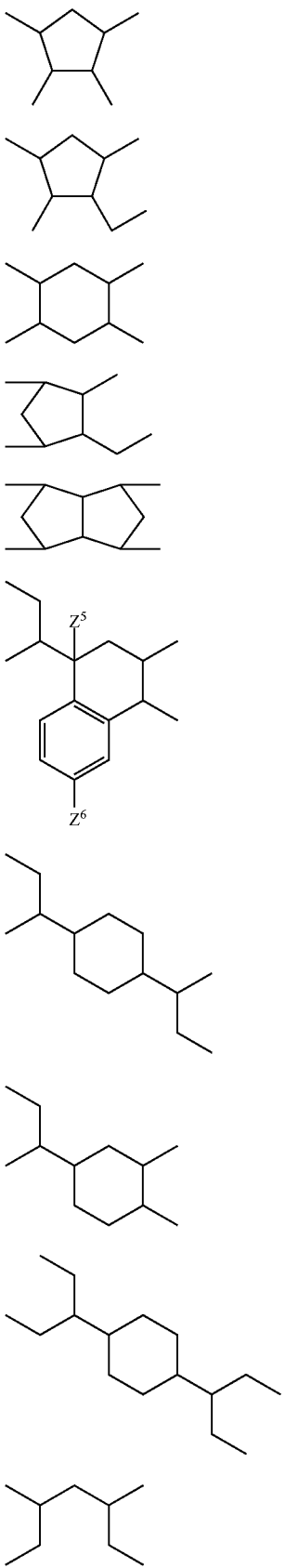

Z¹ to Z⁴ are each independently at least one member selected from the group consisting of a hydrogen atom, a methyl group, a chlorine atom and a benzene ring.

Z⁵ and Z⁶ are each independently a hydrogen atom or a methyl group.

Z in the formula [3] is preferably a structure of the formula [3a], [3c], [3d], [3e], [3f], [3g] or [3k] in view of easiness of preparation and polymerizability when a polymer is produced. It is more preferably a structure of the formula [3a], [3e], [3f], [3g] or [3k], and in view of optical properties of the obtainable liquid crystal display device, particularly preferably a structure of the formula [3a], [3e], [3f] of [3g].

The proportion of the specific tetracarboxylic acid component is preferably at least 1 mol % based on the entire tetracarboxylic acid component. It is more preferably at least 5 mol %, further preferably at least 10 mol %. It is particularly preferably from 10 to 90 mol % in view of optical properties of the obtainable liquid crystal display device.

Further, in a case where the specific tetracarboxylic acid component of the structure of the above formula [3e], [3f], [3g] or [3k] is used, desired effects will be obtained when its amount is at least 20 mol % based on the entire tetracarboxylic acid component. It is preferably at least 30 mol %. Further, the tetracarboxylic acid component may be entirely composed of the tetracarboxylic acid component of the structure of the formula [3e], [3f], [3g] or [3k].

For the polyimide-based polymer, within a range not to impair the effects of the present invention, other tetracarboxylic acid component other than the specific tetracarboxylic acid component may be used. As such other tetracarboxylic acid component, the following tetracarboxylic acid compound, tetracarboxylic acid dianhydride compound, dicarboxylic acid dihalide compound, dicarboxylic acid dialkyl ester compound or dialkyl ester dihalide compound may be mentioned.

Specifically, other tetracarboxylic acid components disclosed in WO2015/012368 (published on Jan. 29, 2015), pages 34 to 35 may be mentioned. Further, each of the specific tetracarboxylic acid component and other tetracarboxylic acid component may be used alone or in combination of two or more depending upon properties.

The method for preparing the polyimide-based polymer is not particularly limited. Usually, the polyimide-based polymer is obtained by reacting the diamine component and the tetracarboxylic acid component. Specifically, the method disclosed in WO2015/012368 (published on Jan. 29, 2015), pages 35 to 36 may be mentioned.

The reaction of the diamine component and the tetracarboxylic acid component is carried out usually in a solvent containing the diamine component and the tetracarboxylic acid component. The solvent used is not particularly limited so long as the produced polyimide precursor is soluble in it.

Specifically, N-methyl-2-pyrrolidone, N-ethyl-2-pyrrolidone, γ-butyrolactone, N,N-dimethylformamide, N,N-dimethylacetamide, dimethyl sulfoxide or 1,3-dimethyl-imidazolidinone may, for example, be mentioned. In a case where the solubility of the polyimide precursor in a solvent is high, methyl ethyl ketone, cyclohexanone, cyclopentanone, 4-hydroxy-4-methyl-2-pentanone or a solvent of the following formula [D1] to [D3] may be used.

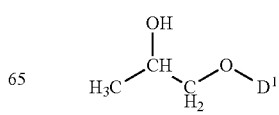
[D1]

-continued

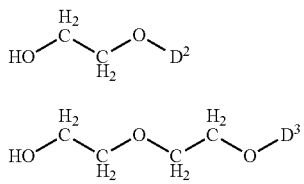
[D2]

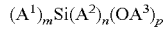
[D3]

Such a solvent may be used alone or as mixed. Further, a solvent in which the polyimide precursor is not soluble may be used as mixed with the above solvent within a range where the formed polyimide precursor is not precipitated. Further, since moisture in an organic solvent will inhibit the polymerization reaction and may cause hydrolysis of the formed polyimide precursor, an organic solvent is preferably one which is dehydrated and dried.

The polyimide is a polyimide obtained by cyclization of the polyimide precursor, and in this polyimide, the cyclization ratio (also called an imidization degree) of amido acid groups is not necessarily 100%, and may optionally be adjusted depending upon the application and the purpose of use. It is preferably from 30 to 80% in view of the solubility of the polyimide-based polymer in a solvent. It is more preferably from 40 to 70%.

The molecular weight of the polyimide-based polymer is preferably from 5,000 to 1,000,000, more preferably from 10,000 to 150,000, aweightweight averagweightcular weight) measured by a GPC (gel permeation chromatography) method considering the strength of the obtainable liquid crystal alignment film, workability at the time of forming the liquid crystal alignment film, and coating property.

In a case where a polysiloxane is used as the specific polymer, it is preferably a polysiloxane obtained by subjecting an alkoxysilane of the following formula [A1] to polycondensation or a polysiloxane obtained by subjecting the alkoxysilane of the formula [A1] and an alkoxysilane of the following formula [A2] or [A3] to polycondensation (hereinafter they will sometimes be generally referred to as a polysiloxane-based polymer).

Alkoxysilane of the formula [A1]:

$$(A^1)_m Si(A^2)_n (OA^3)_p \quad [A1]$$

$A^1$ is the structure of the above formula [1-1] or [1-2]. The structure of the formula [1-1] is preferred, whereby highly stable vertical alignment property of the liquid crystal can be obtained.

In the formula [1-1], the details and the preferred combinations of $X^1$, $X^2$, $X^3$, $X^4$, $X^5$, $X^6$ and n in the formula [1-1] are as defined for the above formula [1-1].

$A^2$ is a hydrogen atom or a $C_{1-5}$ alkyl group. It is preferably a hydrogen atom or a $C_{1-3}$ alkyl group.

$A^3$ is a $C_{1-5}$ alkyl group. It is preferably a $C_{1-3}$ alkyl group in view of the reactivity of polycondensation.

m is an integer of 1 or 2. In view of preparation, it is preferably 1.

n is an integer of from 0 to 2.

p is an integer of from 0 to 3. In view of the reactivity of polycondensation, it is preferably an integer of from 1 to 3, more preferably an integer of 2 or 3.

m+n+p is 4.

As specific examples of the alkoxysilane of the formula [A1], alkoxysilanes of the formulae [2a-1] to [2a-32] disclosed in WO2014/069107 (published on Jan. 22, 2015), pages 17 to 21 may be mentioned.

Among them, particularly preferred as the alkoxysilane are alkoxysilanes of the formulae [2a-9] to [2a-21], [2a-25] to [2a-28] and [2a-32] in WO2014/069107.

The alkoxysilane of the formula [A1] may be used alone or in combination of two or more, depending upon the solubility of the polysiloxane-based polymer in a solvent, the vertical alignment property of the liquid crystal when a vertical liquid crystal alignment film is formed, optical properties of the obtainable liquid crystal display device, etc.

Alkoxysilane of the formula [A2]:

$$(B^1)_m Si(B^2)_n (OB^3)_p \quad [A2]$$

$B^1$ is a $C_{2-12}$ organic group having at least one member selected from the group consisting of a vinyl group, an epoxy group, an amino group, a mercapto group, an isocyanate group, a methacrylic group, an acrylic group, a ureide group and a cinnamoyl group. Among them, in view of availability, preferred is an organic group having a vinyl group, an epoxy group, an amino group, a methacrylic group, an acrylic group or a ureido group. More preferred is an organic group having a methacrylic group, an acrylic group or a ureido group.

$B^2$ is a hydrogen atom or a $C_{1-5}$ alkyl group. Preferred is a hydrogen atom or a $C_{1-3}$ alkyl group.

$B^3$ is a $C_{1-5}$ alkyl group. In view of the reactivity of polycondensation, preferred is a $C_{1-3}$ alkyl group.

m is an integer of 1 or 2. In view of preparation, it is preferably 1.

n is an integer of from 0 to 2.

p is an integer of from 0 to 3. In view of the reactivity of polycondensation, it is preferably an integer of from 1 to 3, more preferably an integer of 2 or 3.

m+n+p is 4.

As specific examples of the alkoxysilane of the formula [A2], alkoxysilanes represented by the formula [2b] disclosed in WO2014/069107 (published on Jan. 22, 2015), pages 22 to 23 may be mentioned.

Among them, preferred is allyltriethoxysilane, allyltrimethoxysilane, diethoxymethylvinylsilane, dimethoxymethylvinylsilane, triethoxyvinylsilane, vinyltrimethoxysilane, vinyltris(2-methoxyethoxy)silane, 3-(triethoxysilyl)propyl methacrylate, 3-(trimethoxysilyl)propyl acrylate, 3-(trimethoxysilyl)propyl methacrylate, 3-glycidyloxypropyl(dimethoxy)methylsilane, 3-glycidyloxypropyl(diethoxy)methylsilane, 3-glycidyloxypropyltrimethoxysilane or 2-(3,4-epoxycyclohexyl)ethyltrimethoxysilane.

The alkoxysilane of the formula [A2] may be used alone or in combination of two or more depending upon the solubility of the polysiloxane-based polymer in a solvent, the vertical alignment property of the liquid crystal when a vertical liquid crystal alignment film is formed, optical properties of the obtainable liquid crystal display device, etc.

Alkoxysilane of the formula [A3]:

$$(D1)_n Si(OD^2)_{4-n} \quad [A3]$$

$D^1$ is a hydrogen atom or a $C_{1-5}$ alkyl group, which may be substituted by a halogen atom, a nitrogen atom, an oxygen atom or a sulfur atom. Preferred is a hydrogen atom or a $C_{1-3}$ alkyl group.

$D^2$ is a $C_{1-5}$ alkyl group. In view of the reactivity of polycondensation, preferred is a $C_{1-3}$ alkyl group.

n is an integer of from 0 to 3.

As specific examples of the alkoxysilane of the formula [A3], alkoxysilanes represented by the formula [2c] disclosed in WO2014/069107 (published on Jan. 22, 2015), page 24, may be mentioned.

As the alkoxysilane of the formula [A3] wherein n is 0, tetramethoxysilane, tetraethoxysilane, tetrapropoxysilane or tetrabutoxysilane may be mentioned, and it is preferred to use such an alkoxysilane as the alkoxysilane of the formula [A3].

The alkoxysilane of the formula [A3] may be used alone or in combination of two or more depending upon the solubility of the polysiloxane-based polymer in a solvent, the vertical alignment property of the liquid crystal when a vertical liquid crystal alignment film is formed, optical properties of the obtainable liquid crystal display device, etc.

The polysiloxane-based polymer is a polysiloxane obtained by subjecting the alkoxysilane of the above formula [A1] to polycondensation or a polysiloxane obtained by subjecting the alkoxysilane of the formula [A1] and the alkoxysilane of the formula [A2] or [A3] to polycondensation. That is, the polysiloxane-based polymer is any one of a polysiloxane obtained by subjecting only the alkoxysilane of the formula [A1] to polycondensation, a polysiloxane obtained by subjecting two types of alkoxysilanes of the formulae [A1] and [A2] to polycondensation, a polysiloxane obtained by subjecting two types of alkoxysilanes of the formula [A1] and [A3] to polycondensation and a polysiloxane obtained by subjecting three types of alkoxysilanes of the formulae [A1], [A2] and [A3] to polycondensation.

Among them, in view of the reactivity of polycondensation and the solubility of the polysiloxane-based polymer in a solvent, preferred is a polysiloxane obtained by subjecting a plurality of alkoxysilanes to polycondensation. That is, it is preferred to use any one of the polysiloxane obtained by subjecting two types of alkoxysilanes of the formulae [A1] and [A2] to polycondensation, the polysiloxane obtained by subjecting two types of alkoxysilanes of the formulae [A1] and [A3] to polycondensation and the polysiloxane obtained by subjecting three types of alkoxysilanes of the formulae [A1], [A2] and [A3] to polycondensation.

In a case where a plurality of alkoxysilanes are used to prepare the polysiloxane-based polymer, the proportion of the alkoxysilane of the formula [A1] is preferably from 1 to 40 mol %, more preferably from 1 to 30 mol % based on all the alkoxysilanes. The proportion of the alkoxysilane of the formula [A2] is preferably from 1 to 70 mol %, more preferably from 1 to 60 mol % based on all the alkoxysilanes. Further, the proportion of the alkoxysilane of the formula [A3] is preferably from 1 to 99 mol %, more preferably from 1 to 80 mol % based on all the alkoxysilanes.

The method for obtaining the polysiloxane-based polymer by polycondensation is not particularly limited. Specifically, a method disclosed in WO2015/012368 (published on Jan. 29, 2015), pages 26 to 29 may be mentioned.

In the polycondensation reaction to prepare the polysiloxane-based polymer, in a case where a plurality of alkoxysilanes of the formulae [A1] and [A2] or [A3] are used, the plurality of the alkoxysilanes may be preliminarily mixed and reacted, or the plurality of alkoxysilanes may be sequentially added and reacted.

In the present invention, a solution of the polysiloxane-based polymer obtained by the above method may be used as it is as the specific polymer, or as the case requires, the solution of the polysiloxane-based polymer obtained by the above method may be concentrated or diluted with a solvent, or the solvent may be replaced with another solvent, and then the resulting solution is used as the specific polymer.

The solvent used for dilution (hereinafter sometimes referred to as addition solvent) may be the solvent used for the polycondensation reaction or may be another solvent. The addition solvent is not particularly limited so long as the polysiloxane-based polymer is uniformly dissolved, and one or more types may be optionally selected. Such an addition solvent may, for example, be the solvent used for the polycondensation reaction and in addition, a ketone solvent such as acetone, methyl ethyl ketone or methyl isobutyl ketone or an ester solvent such as methyl acetate, ethyl acetate or ethyl lactate.

Further, in a case where the polysiloxane-based polymer and another polymer are used as the specific polymer, it is preferred to distill off an alcohol generated at the time of the polycondensation reaction to obtain the polysiloxane-based polymer, under ordinary pressure or under reduced pressure before another polymer is mixed with the polysiloxane-based polymer.

<Liquid Crystal Aligning Agent>

The liquid crystal aligning agent in the present invention is a solution for forming a vertical liquid crystal alignment film and is a solution containing the specific polymer having the specific side chain structure of the above formula [1-1] or [1-2], and a solvent.

The specific polymer having the specific side chain structure is not particularly limited and is preferably at least one polymer selected from the group consisting of an acrylic polymer, a methacrylic polymer, a novolac resin, a polyhydroxystyrene, a polyimide precursor, a polyimide, a polyamide, a polyester, a cellulose and a polysiloxane. Among them, preferred is a polyimide precursor, a polyimide or a polysiloxane. Further, as the specific polymer, one or more of such polymers may be used.

All the polymer components in the liquid crystal aligning agent may be the specific polymers, or other polymer may be mixed. In such a case, the content of other polymer is from 0.5 to 15 parts by mass, preferably from 1 to 10 parts by mass per 100 parts by mass of the specific polymer. As such other polymer, the above polymer having no specific side chain structure of the formula [1-1] or [1-2] may be mentioned.

The content of the solvent in the liquid crystal aligning agent may be properly selected in view of the method of applying the liquid crystal aligning agent and with a view to obtaining a desired film thickness. Particularly, with a view to forming a more uniform vertical liquid crystal alignment film by coating, the content of the solvent in the liquid crystal aligning agent is preferably from 50 to 99.9 mass %, more preferably from 60 to 99 mass %, particularly preferably from 65 to 99 mass %.

The solvent used for the liquid crystal aligning agent is not particularly limited so long as a specific polymer is soluble in it. Particularly in a case where the specific polymer is the polyimide precursor, the polyimide, a polyamide or a polyester, or in a case where the solubility of an acrylic polymer, methacrylic polymer, novolac resin, polyhydroxystyrene, cellulose or polysiloxane in a solvent is low, it is preferred to use the following solvent (also called class A solvent).

For example, N,N-dimethylformamide, N, N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone or 4-hydroxy-4-methyl-2-pentanone may be mentioned. Among them, it is preferred to use N-methyl-2-pyrrolidone, N-ethyl-2-pyrrolidone or γ-butyrolactone. They may be used alone or in combination as a mixture.

In a case where the specific polymer is an acrylic polymer, a methacrylic polymer, a novolac resin, a polyhydroxystyrene, a cellulose or a polysiloxane, or further in a case where the specific polymer is the polyimide precursor, the polyimide, a polyamide or a polyester and the solubility of such a specific polymer in a solvent is high, the following solvent (also called class B solvent) may be employed.

As specific examples of the class B solvent, class B solvents disclosed in WO2014/171493 (published on Oct. 23, 2014) may be mentioned. Among them, it is preferred to use 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone or a solvent of any of the above formulae [D1] to [D3].

Further, when such a class B solvent is used, for the purpose of improving the coating property of the liquid crystal aligning agent, it is preferred to use N-methyl-2-pyrrolidone, N-ethyl-2-pyrrolidone or γ-butyrolactone which is the above class A solvent in combination. It is more preferred to use γ-butyrolactone in combination.

Since such a class B solvent can improve the coating property and the surface smoothness when the liquid crystal aligning agent is applied to form a vertical liquid crystal alignment film, in a case where the polyimide precursor, the polyimide, a polyamide or a polyester is used as the specific polymer, such a class B solvent is preferably used in combination with the above class A solvent. In such a case, the proportion of the class B solvent is preferably from 1 to 99 mass % based on the entire solvent contained in the liquid crystal aligning agent. It is more preferably from 10 to 99 mass %, further preferably from 20 to 95 mass %.

In the present invention, it is preferred to incorporate, in the liquid crystal aligning agent, at least one generator (hereinafter sometimes referred to as a specific generator) selected from the group consisting of a photo-radical generator, a photo-acid generator and a photo-base generator.

As the specific generator, specifically, specific generators disclosed in WO2014/171493 (published on Oct. 23, 2014), pages 54 to 56 may be mentioned. Among them, it is preferred to use as the specific generator, a photo-radical generator, in view of the adhesion between the liquid crystal layer and the vertical liquid crystal alignment film.

It is preferred to incorporate, in the liquid crystal aligning agent, a compound (hereinafter sometimes referred to as a specific adhesive compound) having at least one structure selected from the group consisting of structures of the following formulae [b-1] to [b-8], for the purpose of improving the adhesion between the liquid crystal layer and the vertical liquid crystal alignment film.

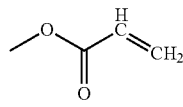
[b-1]

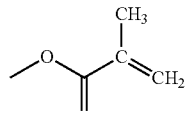
[b-2]

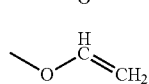
[b-3]

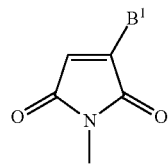
[b-4]

[b-5]

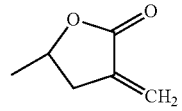
[b-6]

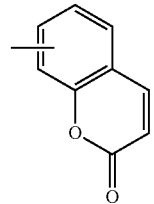
[b-7]

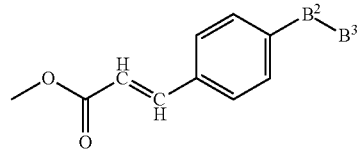
[b-8]

wherein $B^1$ is a hydrogen atom or a benzene ring, $B^2$ is at least one cyclic group selected from the group consisting of a benzene ring, a cyclohexane ring and a heterocyclic ring, and $B^3$ is at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group.

As the specific adhesive compound, specifically, compounds of the formula [6] disclosed in WO2015/012368 (published on Jan. 29, 2015), pages 43 to 46 may be mentioned.

Among them, it is preferred to use, as the specific adhesive compound, at least one compound selected from the group consisting of compounds of the following formulae [6-1] to [6-5].

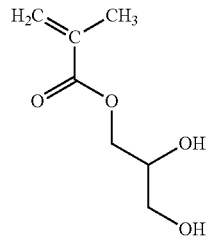
[6-1]

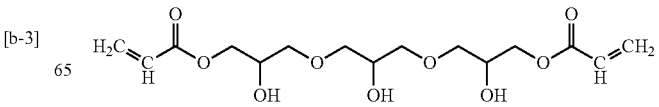
[6-2]

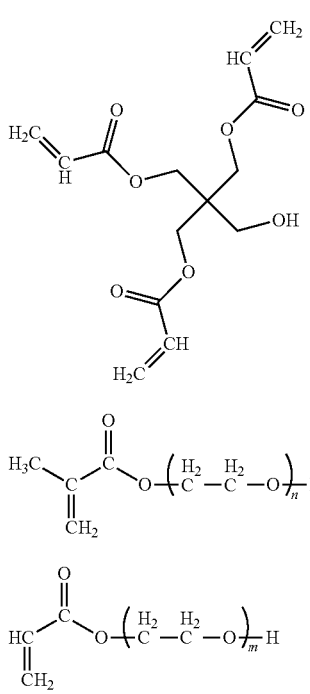

[6-3]

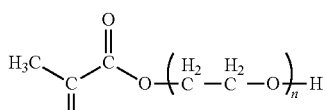

[6-4]

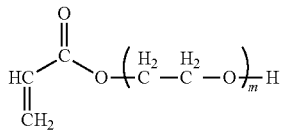

[6-5]

wherein n is an integer of from 1 to 10, and m is an integer of from 1 to 10.

Further, as the specific adhesive compound, adhesive compounds disclosed in WO2014/171493 (published on Oct. 23, 2014), pages 61 to 63 may also be used.

The content of the specific adhesive compound in the liquid crystal aligning agent is preferably from 0.1 to 150 parts by mass per 100 parts by mass of all the polymer components. In order that the crosslink reaction proceed and the desired effects are obtained, it is more preferably from 0.1 to 100 parts by mass, most preferably from 1 to 50 parts by mass per 100 parts by mass of all the polymer components.

The specific adhesive compound may be used alone or in combination of two or more, depending upon the vertical alignment property of the liquid crystal when a vertical liquid crystal alignment film is formed, optical properties of the obtainable liquid crystal display device, etc.

It is preferred to incorporate, in the liquid crystal aligning agent, within a range not to impair the effects of the present invention, a compound having an epoxy group, an isocyanate group, an oxetane group or a cyclocarbonate group, or a compound having at least one type of group selected from the group consisting of a hydroxy group, a hydroxyalkyl group and a lower alkoxyalkyl group (such compounds will sometimes be generally referred to as a specific crosslinkable compound). In such a case, the compound has to have at least two such groups.

As the crosslinkable compound having an epoxy group or an isocyanate group, specifically, crosslinkable compounds having an epoxy group or an isocyanate group disclosed in WO2014/171493 (published on Oct. 23, 2014), pages 63 to 64 may be mentioned.

As the crosslinkable group having an oxetane group, specifically, crosslinkable compounds of the formulae [4a] to [4k] disclosed in WO2011/132751 (published on Oct. 27, 2011), pages 58 to 59 may be mentioned.

As the crosslinkable compound having a cyclocarbonate group, specifically, crosslinkable compounds of the formulae [5-1] to [5-42] disclosed in WO2012/014898 (published on Feb. 2, 2012), pages 76 to 82 may be mentioned.

As the crosslinkable compound having a hydroxy group, a hydroxyalkyl group or a lower alkoxyalkyl group, specifically, melamine derivatives and benzoguanamine derivatives disclosed in WO2014/171493 (published on Oct. 23, 2014), pages 65 to 66 and crosslinkable compounds of the formulae [6-1] to [6-48] disclosed in WO2011/132751 (published on Oct. 27, 2011), pages 62 to 66 may be mentioned.

The content of the specific crosslinkable compound in the liquid crystal aligning agent is preferably from 0.1 to 100 parts by mass per 100 parts by mass of all the polymer components. In order that the crosslink reaction proceeds and the desired effects are achieved, it is more preferably from 0.1 to 50 parts by mass, most preferably from 1 to 30 parts by mass per 100 parts by mass of all the polymer components.

It is possible to incorporate in the liquid crystal aligning agent a nitrogen-containing heterocyclic amine compound represented by any of the formulae [M1] to [M156] disclosed in WO2011/132751 (published on Oct. 27, 2011), pages 69 to 73, in order to promote charge transfer in the liquid crystal alignment film and to promote charge loss of the device. Such an amine compound may be directly added to the liquid crystal aligning agent, but is preferably added in the form of a solution in a proper solvent at a concentration of from 0.1 to 10 mass %, preferably from 1 to 7 mass %. The solvent is not particularly limited so long as it is an organic solvent in which the specific polymer is dissolved.

Further, for the liquid crystal aligning agent, within a range not to impair the effects of the present invention, a compound which improves the film thickness uniformity or the surface smoothness of an obtainable vertical liquid crystal alignment film when the liquid crystal aligning agent is applied may be used. Further, a compound which improves the adhesion between the vertical liquid crystal alignment film and the substrate, or the like, may be used.

The compound which improves the film thickness uniformity or the surface smoothness of the liquid crystal alignment film may, for example, be a fluorinated surfactant, a silicone surfactant or a nonionic surfactant. Specifically, surfactants disclosed in WO2014/171493 (published on Oct. 23, 2014), page 67 may be mentioned. Further, the proportion of the surfactant is preferably from 0.01 to 2 parts by mass, more preferably from 0.01 to 1 part by mass per 100 parts by mass of all the polymer components contained in the liquid crystal aligning agent.

As the compound which improves the adhesion between the liquid crystal alignment film and the substrate, compounds disclosed in WO2014/171493 (Oct. 23, 2014), pages 67 to 69 may be mentioned. Further, the proportion of such a compound is preferably from 0.1 to 30 parts by mass, more preferably from 1 to 20 parts by mass per 100 parts by mass of all the polymer components contained in the liquid crystal aligning agent.

In the liquid crystal aligning agent, in addition to the above compounds, a dielectric or an electrically conductive substance for the purpose of changing the electrical properties of the obtainable liquid crystal alignment film, such as the dielectric constant or the electrical conductivity, may be incorporated.

<Method for Preparing Vertical Liquid Crystal Alignment Film and Liquid Crystal Display Device>

The substrate used for the liquid crystal display device of the present invention is not particularly limited so long as it is a highly transparent substrate, and not only a glass substrate, but also a plastic substrate such as an acrylic substrate, a polycarbonate substrate or a PET (polyethylene terephthalate) substrate, and further a plastic film may be used. In a case where the liquid crystal display device is used as a reverse device for a light control window or the like, the substrate is preferably a plastic substrate or film. Further, from the viewpoint of simplification of the process, it is preferred to use a substrate having an ITO (indium tin oxide) electrode, an IZO (indium zinc oxide) electrode, an IGZO (indium gallium zinc oxide) electrode, an organic conductive film or the like to power the liquid crystal formed thereon. Further, in a case where the device is a reflection-type reverse device, a substrate having a silicon wafer, a metal such as aluminum or a dielectric multilayer film formed thereon may be used only for one of the substrates.

In the liquid crystal display device, at least one of the substrates has a vertical liquid crystal alignment film to vertically align liquid crystal molecules. This vertical liquid crystal alignment film may be obtained by applying the liquid crystal aligning agent to the substrate, followed by baking and by alignment treatment e.g. by rubbing treatment or light irradiation. However, in the case of the vertical liquid crystal alignment film in the present invention, the baked film may be used as the vertical liquid crystal alignment film even without such an alignment treatment.

The method of applying the liquid crystal aligning agent is not particularly limited, and industrially, screen printing, offset printing, flexographic printing, an ink jet method, a dipping method, a roll coater method, a slit coater method, a spinner method or a spraying method may, for example, be mentioned, and the method may be properly selected depending upon the type of the substrate and the film thickness of the aimed vertical liquid crystal alignment film.

After the liquid crystal aligning agent is applied to the substrate, the solvent is evaporated at a temperature of from 30 to 300° C., preferably from 30 to 250° C., depending upon the type of the substrate and the solvent used for the liquid crystal aligning agent, by a heating means such as a hotplate, a circulating hot air oven or an IR (infrared) oven to form the vertical liquid crystal alignment film. Particularly when a plastic substrate is used as the substrate, the treatment is carried out preferably at a temperature of from 30 to 150° C.

If the thickness of the vertical liquid crystal alignment film after baking is too thick, such is disadvantageous in view of the electrical power consumption of the liquid crystal display device, and if it is too thin, the reliability of the device may be lowered, and accordingly it is preferably from 5 to 500 nm. It is more preferably from 10 to 300 nm, particularly preferably from 10 to 250 nm.

The liquid crystal composition used for the liquid crystal display device is the above-described liquid crystal composition, and it is possible to incorporate spacers to control the space between electrodes (also called a gap) of the liquid crystal display device, in the liquid crystal composition.

The method of injecting the liquid crystal composition is not particularly limited, and for example, the following method may be mentioned. That is, in a case where a glass substrate is used as the substrate, a pair of substrates having the vertical liquid crystal alignment film formed thereon is prepared, a sealing agent is applied to four sides of one of the substrates except for a part, and the other substrate is bonded so that the vertical liquid crystal alignment film faces inside, to prepare an empty cell. And, the liquid crystal composition is vacuum injected from a part not coated with the sealing agent, to obtain a cell containing the liquid crystal composition. In a case where a plastic substrate or film is used as the substrate, a method may be mentioned in which a pair of substrates having the vertical liquid crystal alignment film formed thereon is prepared, the liquid crystal composition is dropped on one of the substrates by an ODF (one drop filling) method or an inkjet method, and then the other substrate is bonded to obtain a cell containing the liquid crystal composition. In the liquid crystal display device of the present invention, since the adhesion between the liquid crystal layer and the vertical liquid crystal alignment film is high, it is not necessary to apply a sealing agent to four sides of the substrate.

The gap of the liquid crystal display device may be controlled e.g. by the above mentioned spacers. As the method, as mentioned above, a method of introducing spacers having the desired size in the liquid crystal composition, or a method of using a substrate having a column spacer having the desired size may, for example, be mentioned. Further, in a case where a plastic or film substrate is used as the substrate and the substrates are bonded by laminating, the gap can be controlled without introducing spacers.

The gap of the liquid crystal display device is preferably from 1 to 100 μm, more preferably from 1 to 50 μm, particularly preferably from 2 to 30 μm. If the gap is too small, the contrast of the liquid crystal display device tends to decrease, and if it is too large, the drive voltage of the device tends to be high.

The liquid crystal display device of the present invention is obtained by curing the liquid crystal composition by irradiation with ultraviolet rays in such a state that the liquid crystal composition partly or entirely shows liquid crystallinity to form a cured product of the liquid crystal composition. Curing of the liquid crystal composition is carried out by irradiating the above cell containing the liquid crystal composition with ultraviolet rays. As an apparatus to apply ultraviolet rays (hereinafter sometimes referred to as an ultraviolet irradiation apparatus), a known apparatus may be used.

Specifically, as a light source of the ultraviolet irradiation apparatus, for example, a metal halide lamp, a high pressure mercury lamp or an ultraviolet light-emitting diode may be mentioned. Among them, it is preferred to use, as the light source of the ultraviolet irradiation apparatus in the present invention, an ultraviolet light-emitting diode (an ultraviolet irradiation apparatus employing an ultraviolet light-emitting diode will sometimes be referred to as a specific ultraviolet irradiation apparatus), in that the loss of the irradiation intensity is little even without using a wavelength-selective filter, ultraviolet rays having a specific wavelength can be applied, and further, the heat generated from the light source can be suppressed. Further, it is preferred that the light source is disposed on the upper and lower parts of the specific ultraviolet irradiation apparatus so as to further promote curing of the liquid crystal composition.

Figure 2:
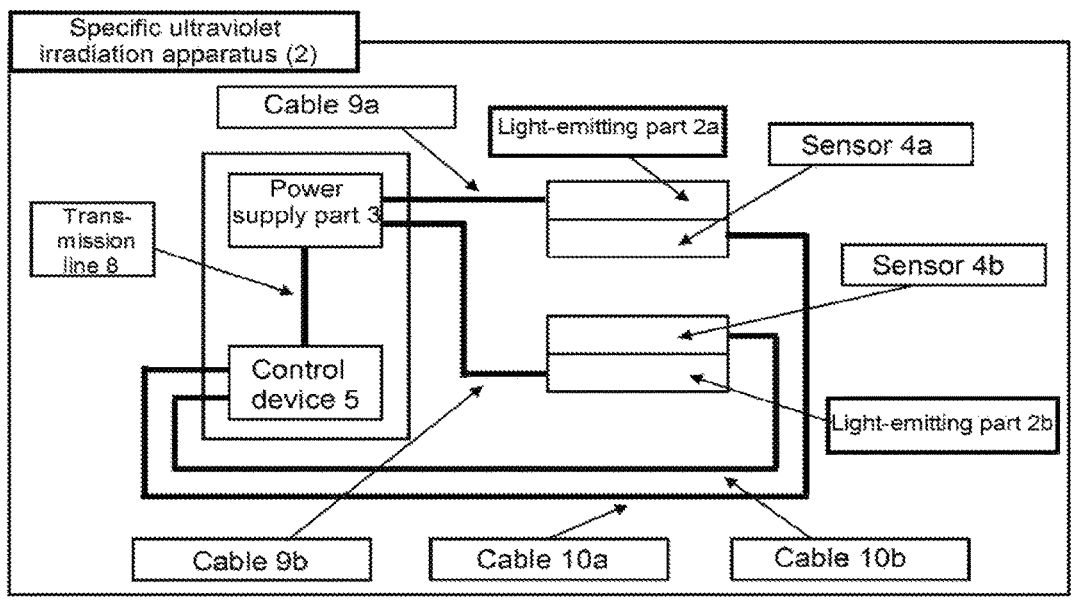
FIG. 2 is a view illustrating a specific ultraviolet irradiation apparatus (2) in the present invention.

Preferred specific examples of the specific ultraviolet irradiation apparatus are as shown in FIGS. 1 and 2. The specific ultraviolet irradiation apparatus will be described with reference to these drawings.

FIG. 1 is a view schematically illustrating one specific ultraviolet irradiation apparatus (hereinafter sometimes referred to as a specific ultraviolet irradiation apparatus (1)). In FIG. 1, the numerical reference 2 represents a light-emitting part, and 3 represents a power supply part. The light-emitting part 2 is provided with a plurality of ultraviolet light-emitting diodes as the light source, and each ultraviolet light-emitting diode is so constituted as to emit light powdered by the power supply part 3 via a flexible cord 6 to apply ultraviolet rays with an aimed intensity. Each ultraviolet light-emitting diode emits ultraviolet rays at a single wavelength, and emits ultraviolet rays at a wavelength required for preparation of the liquid crystal display device.

Further, the light-emitting part 2 is attached at the tip of a manipulator which is not shown in FIG. 1, and can be freely moved to or stopped at an optional position in a working space in accordance with an existing program or under control by an operator. Further, the angle of direction of the light-emitting part 2 or the ultraviolet light-emitting diode can be freely changed so that the ultraviolet rays can be applied to an aimed direction. Accordingly, this specific ultraviolet irradiation apparatus (1) can be suitably used e.g. in a case where only one part of an object to be treated, that is, the above cell containing the liquid crystal composition, should be partially exposed with a narrow range, or in a case where ultraviolet rays are applied to an object to be treated having a complicated shape or a steric structure.

Further, the specific ultraviolet irradiation apparatus (1) is so constituted as to always monitor the irradiation intensity of ultraviolet rays applied to the object to be treated, i.e. the cell containing the liquid crystal composition, brightness and the temperature and to control them to be within certain ranges. Specifically, a sensor 4 which measures the intensity of ultraviolet rays applied from the ultraviolet light-emitting diode, and the brightness and the temperature on the surface of the object to be treated, is disposed in the vicinity of the light-emitting part 2, and values measured by the sensor 4 are always input into a control device 5 via a flexible cord 7. The control device 5 contains an arithmetic circuit, and on receiving the values measured by the sensor 4, calculates output conditions (hereinafter sometimes referred to as power supply values) of the ultraviolet light-emitting diode required to control the irradiation intensity of ultraviolet rays applied to the object to be treated, the brightness and the temperature to be within certain ranges, by the arithmetic circuit, and calculates correction values of output conditions from the difference with the actual output conditions. The correction values of the output conditions are transmitted from the control device 5 via a transmission line 8 to the power supply part 3. And, the power supply part 3 changes the output conditions on receiving the transmitted correction values. As a result, the irradiation intensity of ultraviolet rays, the brightness and the temperature can be controlled to be within certain ranges.

Here, the items to be controlled may optionally be selected depending upon the type and the properties of the object to be treated, i.e. the cell containing the liquid crystal composition, and it is possible to control all of the irradiation intensity of ultraviolet rays, the brightness and the temperature, or it is possible to control only one or two of them. Further, the upper limit value and the lower limit value of each item to be controlled may optionally be selected depending upon the type and the properties of the object to be treated.

In addition, it is possible to provide a focusing lens on the tip of the ultraviolet light-emitting diode. In such a case, ultraviolet rays applied can be focused, and application of ultraviolet rays to a very small range, for example, a range of at most 1 μm is possible. Further, in a case where the focusing lens is provided to be freely controlled, the range of application of ultraviolet rays can be freely changed within a range of the performance of the lens.

FIG. 2 is a view schematically illustrating another specific ultraviolet irradiation apparatus (hereinafter sometimes referred to as a specific ultraviolet irradiation apparatus (2)).

As shown in FIG. 2, the specific ultraviolet irradiation apparatus (2) has two light-emitting parts 2a and 2b disposed in parallel with each other in upper and lower parts with a predetermined distance. In each of the light-emitting parts 2a and 2b, as the light source, many (n×m) ultraviolet light-emitting diodes are aligned in lines in a lattice form (n×m) in a horizontal direction. In the specific ultraviolet irradiation apparatus (2), in each light-emitting parts 2a and 2b, the ultraviolet light-emitting diodes are aligned in lines in a n×m lattice form, however, an ultraviolet irradiation apparatus in which the ultraviolet light-emitting diodes are disposed in a houndstooth check, radial or honeycomb shape may also be used. Further, the direction of the ultraviolet light-emitting diodes in lines may not necessarily be the horizontal direction, so long as they are aligned in lines in a planar direction, that is, along one plane or a gently curved surface. Specifically, for example, an ultraviolet irradiation apparatus in which ultraviolet light-emitting diodes are aligned in lines in a vertical direction may be employed.

In addition, each of such ultraviolet light-emitting diodes emits ultraviolet rays at a single wavelength and emits ultraviolet rays at a wavelength necessary for preparation of the liquid crystal display device, in the same manner as the above specific ultraviolet irradiation apparatus (1).

Each of the ultraviolet light-emitting diodes in the upper light-emitting part 2a is disposed downward, and is so constituted as to emit light powered by a power supply part 3 via a cable 9a to apply ultraviolet rays at with aimed intensity downward. On the other hand, each of the ultraviolet light-emitting diodes in the lower light-emitting part 2b is disposed upward, and is so constituted as to emit light powered by the power supply part 2 via a cable 9b to apply ultraviolet rays with an aimed intensity upward. As mentioned above, by the specific ultraviolet irradiation apparatus (2), it is possible to apply ultraviolet rays in a plane of the object to be treated, i.e. the cell containing the liquid crystal composition, and further it is possible to apply ultraviolet rays simultaneously to the upper surface side and the lower surface side of the object to be treated.

Further, the specific ultraviolet irradiation apparatus (2) is so constituted as to always monitor the irradiation intensity of ultraviolet rays applied to the object to be treated, i.e. the cell containing the liquid crystal composition, the brightness and the temperature and to control them to be within certain ranges. Specifically, sensors 4a and 4b which measure the intensity of ultraviolet rays applied from the ultraviolet light-emitting diodes, and the brightness and the temperature on the surface of the object to be treated, are disposed respectively in the vicinity of the light-emitting parts 2a and 2b, and values measured by the sensors 4a and 4b are always input into a control device 5 via cables 10a and 10b. The control device 5 contains an arithmetic circuit, and on receiving the values measured by the sensors 4a and 4b, calculates output conditions (hereinafter sometimes referred to as power supply values) of the ultraviolet light-emitting diodes required to control the irradiation intensity of ultraviolet rays applied to the object to be treated, the brightness and the temperature to be within certain ranges, by the arithmetic circuit, and calculates correction values of output conditions from the difference with the actual output conditions. The correction values of the output conditions are transmitted from the control device 5 via a transmission line 8 to the power supply part 3. And, the power supply part 3 changes the output conditions on receiving the transmitted correction values. As a result, the radiation intensity of ultraviolet rays, the brightness and the temperature can be controlled to be within certain ranges.

In the specific ultraviolet irradiation apparatus (2), the output (hereinafter sometimes referred to as a power supply amount) of all the ultraviolet light-emitting diodes disposed in the light-emitting parts 2a and 2b can be adjusted individually. Further, since the sensors 4a and 4b correspond to each of the ultraviolet light-emitting diodes disposed in the light-emitting parts 2a and 2b individually, the irradiation intensity of ultraviolet rays from all the ultraviolet light-emitting diodes, the brightness and the temperature can be individually controlled. Accordingly, it is possible to minimize the dispersion of the irradiation intensity of ultraviolet rays applied, the brightness and the surface temperature of the object to be treated, i.e. the cell containing the liquid crystal composition, and to uniformly apply ultraviolet rays over the entire surface of the object to be treated. Further, it is possible to create an optimum ultraviolet irradiation environment depending upon the properties of the object to be treated, the purpose, etc., by preliminarily preparing appropriate controlled conditions (hereinafter sometimes referred to as a profile) depending upon the type of the object to be treated and its preparation process and applying the profile when the ultraviolet rays are applied.

As specific examples of the profile, (1), the irradiation intensities of all the ultraviolet light-emitting diodes are 100%, (2), the irradiation intensities of half of the ultraviolet light-emitting diodes are 100%, and the irradiation intensities of the other half of ultraviolet light-emitting diodes are 50%, (3) the irradiation intensities of one third of ultraviolet light-emitting diodes are 50%, and the irradiation intensities of the remaining ultraviolet light-emitting diodes are 25%, may, for example, be mentioned.

To prepare the liquid crystal display device of the present invention, it is preferred to employ the above specific ultraviolet irradiation apparatus (1) or ultraviolet irradiation apparatus (2), whereby the wavelength and the irradiation intensity of ultraviolet rays applied, the brightness and the temperature can be controlled. It is particularly preferred to employ the specific ultraviolet irradiation apparatus (2).

Further, in a case where the specific ultraviolet irradiation apparatus (1) or the specific ultraviolet irradiation apparatus (2) is used, the wavelength of ultraviolet rays from the ultraviolet light-emitting diode is preferably from 200 to 500 nm, more preferably from 250 to 450 nm. It is particularly preferably from 300 to 400 nm. Further, the irradiation intensity of the ultraviolet light-emitting diode is preferably from 0.1 to 150 mW/cm$^2$, more preferably from 1 to 100 mW/cm$^2$. It is particularly preferably from 1 to 40 mW/cm$^2$. In addition, the irradiation time of ultraviolet rays is preferably from 1 to 600 seconds, more preferably from 5 to 300 seconds. It is particularly preferably from 10 to 120 seconds.

Further, when ultraviolet rays are applied by using the specific ultraviolet irradiation apparatus (1) or the specific ultraviolet irradiation apparatus (2), the surface temperature of the object to be treated, i.e. the cell containing the liquid crystal composition is preferably from 0 to 100° C., more preferably from 10 to 50° C. It is particularly preferably from 15 to 30° C.

As described above, by using the liquid crystal composition containing the specific compound and the vertical liquid crystal alignment film obtained from the liquid crystal aligning agent containing a polymer having the specific side chain structure, a liquid crystal display device can be obtained in which favorable optical properties, that is, favorable transparency when no voltage is applied and favorable scattering property when a voltage is applied are achieved, and the adhesion between the liquid crystal layer and the vertical liquid crystal alignment film is high.

EXAMPLES

Now, the present invention will be described in further detail with reference to Examples. However, it should be understood that the present invention is by no means restricted thereto. Abbreviations used in Examples are as follows.

(Specific Side Chain Type Diamine)
A1: 1,3-diamino-4-[4-(trans-4-n-heptylcyclohexyl)phenoxymethyl]benzene
A2: 1,3-diamino-4-{4-[trans-4-(trans-4-n-pentylcyclohexyl)cyclohexyl]phenoxy}benzene
A3: diamine represented by the following formula [A3]
A4: 1,3-diamino-4-octadecyloxybenzene

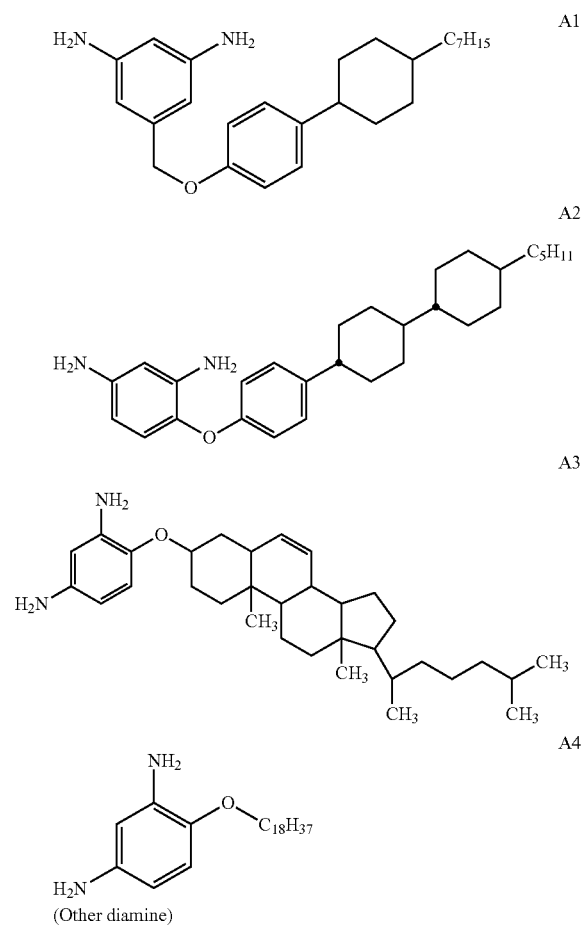

(Other diamine)

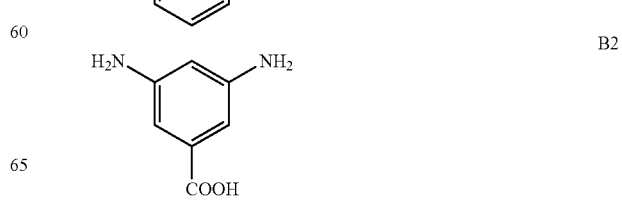

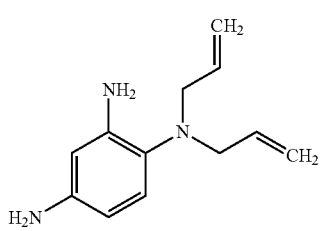

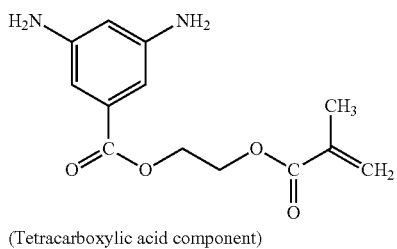

(Tetracarboxylic acid component)

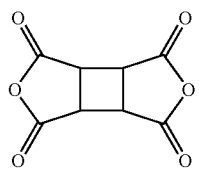
C1

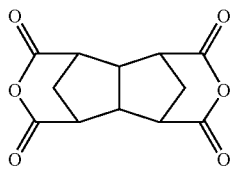
C2

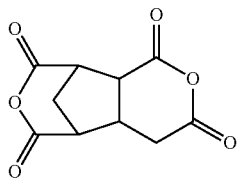
C3

<Monomer to Prepare Polysiloxane-Based Polymer>
D1: alkoxysilane monomer represented by the following formula [D1]
D2: octadecyltriethoxysilane
D3: 3-methacryloxypropyltrimethoxysilane
D4: 3-ureidopropyltriethoxysilane
D5: tetraethoxysilane

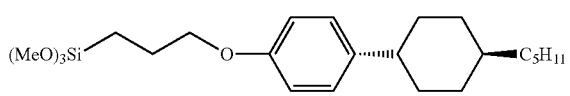
D1

<Photo-Radical Generator>

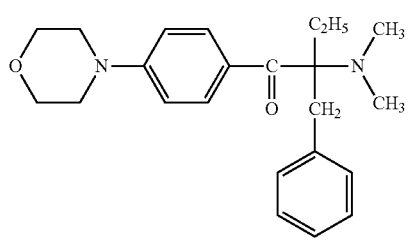
N1

<Adhesive Compound>

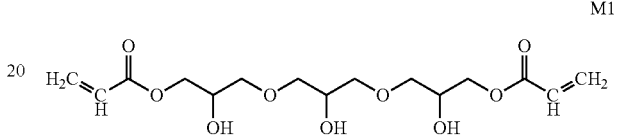
M1

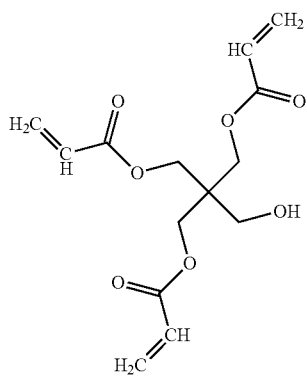
M2

<Specific Crosslinkable Compound>

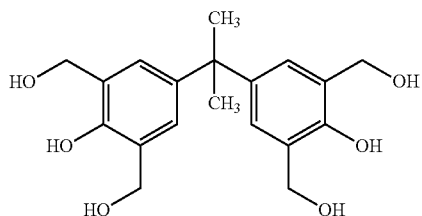
K1

<Solvent>
NMP: N-Methyl-2-pyrrolidone
NEP: N-Ethyl-2-pyrrolidone
γ-BL: γ-Butyrolactone
BCS: Ethylene glycol monobutyl ether
PB: Propylene glycol monobutyl ether
PGME: Propylene glycol monomethyl ether

[Measurement of Molecular Weight of Polyimide-Based Polymer]

The molecular weight was measured using a room temperature gel permeation chromatography (GPC) apparatus (GPC-101, manufactured by SHOWA DENKO K.K.) and columns (KD-803, KD-805, Shodex) as follows.

Column temperature: 50° C.
Eluent: N,N'-Dimethylformamide (as additives, 30 mmol/L (liter) of lithium bromide monohydrate ($LiBr \cdot H_2O$), 30 mmol/L of phosphoric acid anhydride crystals (o-phosphoric acid) and 10 ml/L of tetrahydrofuran (THF))

Flow rate: 1.0 ml/min

Standard sample for preparation of analytical curve: TSK standard polyethylene oxide (molecular weight: about 900,000, 150,000, 100,000 and 30,000) (manufactured by TOSOH CORPORATION) and polyethylene glycol (molecular weight: about 12,000, 4,000 and 1,000) (manufactured by Polymer Laboratories Ltd.)

[Measurement of Imidization Degree of Polyimide-Based Polymer]

20 mg of a polyimide powder was put in an NMR (nuclear magnetic resonance) sample tube (NMR sampling tube standard, Φ5 (manufactured by KUSANO SCIENTIFIC CORPORATION)), and deuterated dimethyl sulfoxide (DMSO-d6, 0.05 mass % TMS (tetramethylsilane) mixture) (0.53 ml) was added, and ultrasonic waves were applied for complete dissolution. The solution was subjected to 500 MHz proton NMR measurement by an NMR measuring apparatus (JNW-ECA500, manufactured by JEOL Ltd. DATUM Solution Business Operations). The imidization degree was obtained in accordance with the following formula from the peak integrated value of proton derived from a structure which would not be changed as between before and after the imidization as standard proton, and the peak integrated value of proton derived from a NH group of the amide acid which appeared in the vicinity of from 9.5 to 10.0 ppm.

Imidization degree (%)=(1−αx/y)×100 wherein x is the peak integrated value of proton derived from the NH group of the amide acid, y is the peak integrated value of standard proton, and a is the proportion of the number of standard proton per one proton of the NH group of the amide acid in the case of a polyamide acid (imidization degree of 0%).

Preparation of Polyimide-Based Polymer

Preparation Example 1

C2 (3.19 g, 12.8 mmol), A1 (4.59 g, 11.6 mmol) and B2 (2.16 g, 14.2 mmol) were mixed in NMP (24.9 g), followed by reaction at 80° C. for 5 hours, and then C1 (2.50 g, 12.8 mmol) and NMP (12.4 g) were added, followed by reaction at 40° C. for 8 hours to obtain a polyamide acid solution having a resin solid content concentration of 25 mass %.

The obtained polyamide acid solution (30.0 g) was diluted to 6 mass % with NMP, and acetic anhydride (3.85 g) and pyridine (2.40 g) as imidizing catalysts were added, followed by reaction at 50° C. for 2 hours. The obtained reaction solution was poured into methanol (460 ml), and the resulting precipitate was collected by filtration. The precipitate was washed with methanol and vacuum-dried at 100° C. to obtain a polyimide power (1). Of the polyimide, the imidization degree was 56%, Mn (hereinafter sometimes referred to as the number average molecular weight) was 19,200, and Mw (hereinafter sometimes referred to as the weight average molecular weight) was 56,900.

Preparation Example 2

C2 (1.12 g, 4.46 mmol), A2 (3.91 g, 9.04 mmol), B2 (1.72 g, 11.3 mmol) and B3 (0.46 g, 2.26 mmol) were mixed in NEP (21.4 g), followed by reaction at 80° C. for 5 hours, and then C1 (3.50 g, 17.9 mmol) and NEP (10.7 g) were added, followed by reaction at 40° C. for 6 hours to obtain a polyamide acid solution (2) having a resin solid content concentration of 25 mass %. Of the polyamide acid, Mn was 20,900, and Mw was 63,900.

Preparation Example 3

C2 (1.91 g, 7.65 mmol), A3 (3.18 g, 6.46 mmol), B1 (0.28 g, 2.58 mmol) and B2 (2.55 g, 16.8 mmol) were mixed in NMP (22.9 g), followed by reaction at 80° C. for 5 hours, and then C1 (3.50 g, 17.9 mmol) and NMP (11.4 g) were added, followed by reaction at 40° C. for 6 hours to obtain a polyamide acid solution having a resin solid content concentration of 25 mass %.

The obtained polyamide acid solution (30.5 g) was diluted to 6 mass % with NMP, and then acetic anhydride (3.95 g) and pyridine (2.45 g) as imidizing catalysts were added, followed by reaction at 60° C. for 3 hours. The obtained reaction solution was poured into methanol (460 ml), and the resulting precipitate was collected by filtration. The precipitate was washed with methanol and vacuum-dried at 100° C. to obtain a polyimide powder (3). Of the polyimide, the imidization degree was 58%, Mn was 17,100, and Mw was 49,800.

Preparation Example 4

C3 (4.75 g, 21.2 mmol), A1 (4.23 g, 10.7 mmol) and B2 (1.63 g, 10.7 mmol) were mixed in NMP (31.9 g), followed by reaction at 40° C. for 10 hours to obtain a polyamide acid solution having a resin solid content concentration of 25 mass %.

The obtained polyamide acid solution (30.0 g) was diluted to 6 mass % with NMP, and then acetic anhydride (3.75 g) and pyridine (2.50 g) as imidizing catalysts were added, followed by reaction at 50° C. for 2.5 hours. The obtained reaction solution was poured into methanol (460 ml), and the resulting precipitate was collected by filtration. The precipitate was washed with methanol and vacuum-dried at 100° C. to obtain a polyimide powder (4). Of the polyimide, the imidization degree was 51%, Mn was 16,100, and Mw was 45,900.

Preparation Example 5

C3 (4.50 g, 20.1 mmol), A3 (3.76 g, 7.63 mmol) and B2 (2.71 g, 17.8 mmol) were mixed in NMP (23.9 g), followed by reaction at 80° C. for 6 hours, and then C1 (0.98 g, 5.02 mmol) and NMP (12.0 g) were added, followed by reaction at 40° C. for 6 hours to obtain a polyamide acid solution having a resin solid content concentration of 25 mass %.

The obtained polyamide acid solution (30.0 g) was diluted to 6 mass % with NMP, and then acetic anhydride (3.80 g) and pyridine (2.45 g) as imidizing catalysts were added, followed by reaction at 500° C. for 2.5 hours. The obtained reaction solution was poured into methanol (460 ml), and the resulting precipitate was collected by filtration. The precipitate was washed with methanol and vacuum-dried at 100° C. to obtain a polyimide powder (5). Of the polyimide, the imidization degree was 56%, Mn was 15,800, and Mw was 47,100.

Preparation Example 6

C2 (3.19 g, 12.8 mmol), A4 (4.38 g, 11.6 mmol) and B2 (2.16 g, 14.2 mmol) were mixed in NMP (24.5 g), followed by reaction at 80° C. for 5 hours, and then C1 (2.50 g, 12.8 mmol) and NMP (12.2 g) were added, followed by reaction at 40° C. for 8 hours to obtain a polyamide acid solution having a resin solid content concentration of 25 mass %.

The obtained polyamide acid solution (30.0 g) was diluted to 6 mass % with NMP, and then acetic anhydride (3.85 g) and pyridine (2.45 g) as imidizing catalysts were added, followed by reaction at 50° C. for 3 hours. The obtained reaction solution was poured into methanol (460 ml), and the resulting precipitate was collected by filtration. The precipitate was washed with methanol and vacuum-dried at 100° C.

followed by reaction at 50° C. for 2 hours. The obtained reaction solution was poured into methanol (460 ml), and the resulting precipitate was collected by filtration. The precipitate was washed with methanol and vacuum-dried at 100° C. to obtain a polyimide powder (8). Of the polyimide, the imidization degree was 57%, Mn was 21,900, and Mw was 60,800.

The polyimide-based polymers obtained in Preparation Examples are shown in Table 1. In Table 1, *1 represents a polyamide acid.

TABLE 1

| Preparation Example | Polymer component | Tetracarboxylic acid component | Diamine component | | Imidization degree (%) |
| --- | --- | --- | --- | --- | --- |
| | | | Specific side chain type diamine | Other diamine | |
| 1 | Polyimide powder (1) | C1 (2.50 g, 12.8 mmol) C2 (3.19 g, 12.8 mmol) | A1 (4.59 g, 11.6 mmol) | B2 (2.16 g, 14.2 mmol) | 56 |
| 2 | Polyamide acid solution (2) | C1 (3.50 g, 17.9 mmol) C2 (1.12 g, 4.46 mmol) | A2 (3.91 g, 9.04 mmol) | B2 (1.72 g, 11.3 mmol) B3 (0.46 g, 2.26 mmol) | *1 |
| 3 | Polyimide powder (3) | C1 (3.50 g, 17.9 mmol) C2 (1.91 g, 7.65 mmol) | A3 (3.18 g, 6.46 mmol) | B1 (0.28 g, 2.58 mmol) B2 (2.55 g, 16.8 mmol) | 58 |
| 4 | Polyimide powder (4) | C3 (4.75 g, 21.2 mmol) | A1 (4.23 g, 10.7 mmol) | B2 (1.63 g, 10.7 mmol) | 51 |
| 5 | Polyimide powder (5) | C1 (0.98 g, 5.02 mmol) C3 (4.50 g, 20.1 mmol) | A3 (3.76 g, 7.63 mmol) | B2 (2.71 g, 17.8 mmol) | 56 |
| 6 | Polyimide powder (6) | C1 (2.50 g, 12.8 mmol) C2 (3.19 g, 12.8 mmol) | A4 (4.38 g, 11.6 mmol) | B2 (2.16 g, 14.2 mmol) | 55 |
| 7 | Polyimide powder (7) | C1 (2.45 g, 12.5 mmol) C2 (3.13 g, 12.5 mmol) | A1 (4.99 g, 12.7 mmol) | B2 (1.16 g, 7.59 mmol) B4 (1.34 g, 5.06 mmol) | 50 |
| 8 | Polyimide powder (8) | C1 (2.55 g, 13.0 mmol) C2 (3.25 g, 13.0 mmol) | — | B2 (4.01 g, 26.3 mmol) | 57 | to obtain a polyimide powder (6). Of the polyimide, the imidization degree was 55%, Mn was 18,500, and Mw was 56,100.

Preparation Example 7

C2 (3.13 g, 12.5 mmol), A3 (4.99 g, 12.7 mmol), B2 (1.16 g, 7.59 mmol) and B4 (1.34 g, 5.06 mmol) were mixed in NMP (26.1 g), followed by reaction at 50° C. for 8 hours, and then C1 (2.45 g, 12.5 mmol) and NMP (13.1 g) were added, followed by reaction at 40° C. for 8 hours to obtain a polyamide acid solution having a resin solid content concentration of 25 mass %.

The obtained polyamide acid solution (30.0 g) was diluted to 6 mass % with NMP, and then acetic anhydride (2.55 g) and pyridine (2.40 g) as imidizing catalysts were added, followed by reaction at 50° C. for 2.5 hours. The obtained reaction solution was poured into methanol (460 ml), and the resulting precipitate was collected by filtration. The precipitate was washed with methanol and vacuum-dried at 60° C. to obtain a polyimide powder (7). Of the polyimide, the imidization degree was 50%, Mn was 15,500, and Mw was 48,900.

Preparation Example 8

C2 (3.25 g, 13.0 mmol) and B2 (4.01 g, 26.3 mmol) were mixed in NMP (19.6 g), followed by reaction at 80° C. for 1 hour, and then C1 (2.55 g, 13.0 mmol) and NMP (9.81 g) were added, followed by reaction at 40° C. for 8 hours to obtain a polyamide acid solution having a resin solid content concentration of 25 mass %.

The obtained polyamide acid solution (30.0 g) was diluted to 6 mass % with NMP, and then acetic anhydride (3.70 g) and pyridine (2.40 g) as imidizing catalysts were added, Preparation of Polysiloxane-Based Polymer Preparation Example 9

In a 200 ml four-necked reaction flask equipped with a thermometer and a reflux tube, PGME (28.3 g), D1 (4.10 g), D3 (7.45 g) and D5 (32.5 g) were mixed to prepare a solution of an alkoxysilane monomer. To this solution, a solution preliminarily prepared by mixing PGME (14.2 g), water (10.8 g) and oxalic acid (0.70 g) as a catalyst was dropwise added at 25° C. over a period of 30 minutes, followed by stirring at 25° C. for 30 minutes. Then, the mixture was subjected to reflux for 30 minutes with heating in an oil bath, and then a preliminarily prepared mixed solution of a methanol solution (1.20 g) having a D4 content of 92 mass % and PGME (0.90 g) was added. Reflux was conducted further for 30 minutes, and then the mixture was left to cool to obtain a polysiloxane solution (1) having a concentration as calculated as $SiO_2$ of 12 mass %.

Preparation Example 10

In a 200 ml four-necked reaction flask equipped with a thermometer and a reflux tube, PGME (29.2 g), D1 (4.10 g) and D5 (38.8 g) were mixed to prepare a solution of an alkoxysilane monomer. To this solution, a solution preliminarily prepared by mixing PGME (14.6 g), water (10.8 g) and oxalic acid (0.50 g) as a catalyst was dropwise added at 25° C. over a period of 30 minutes, followed by stirring at 25° C. for 30 minutes. Then, the mixture was subjected to reflux for 30 minutes with heating in an oil bath, and then a preliminarily prepared mixed solution of a methanol solution (1.20 g) having a D4 content of 92 mass % and PGME (0.90 g) was added. Reflux was conducted further for 30 minutes, and then the mixture was left to cool to obtain a polysiloxane solution (2) having a concentration as calculated as $SiO_2$ of 12 mass %.

Preparation Example 11

In a 200 ml four-necked reaction flask equipped with a thermometer and a reflux tube, PGME (28.3 g), D2 (4.07 g), D3 (7.45 g) and D5 (32.5 g) were mixed to prepare a solution of an alkoxysilane monomer. To this solution, a solution preliminarily prepared by mixing PGME (14.2 g), water (10.8 g) and oxalic acid (0.70 g) as a catalyst was dropwise added at 25° C. over a period of 30 minutes, followed by stirring at 25° C. for 30 minutes. Then, the mixture was subjected to reflux for 30 minutes with heating in an oil bath, and then a preliminarily prepared mixed solution of a methanol solution (1.20 g) having a D4 content of 92 mass % and PGME (0.90 g) was added. Reflux was conducted further for 30 minutes, and then the mixture was left to cool to obtain a polysiloxane solution (3) having a concentration as calculated as $SiO_2$ of 12 mass %.

The polysiloxane-based polymers (polysiloxane solutions) obtained in Preparation Examples are shown in Table 2.

TABLE 2

| Preparation Example | Polymer component | Alkoxysilane component | | |
|---|---|---|---|---|
| | | Alkoxysilane monomer represented by formula [A1] having specific side chain structure | Alkoxysilane monomer represented by formula [A2] | Alkoxysilane monomer represented by formula [A3] |
| 9 | Polysiloxane solution (1) | D1 (4.10 g) | D3 (7.45 g), D4 (1.10 g) | D5 (32.5 g) |
| 10 | Polysiloxane solution (2) | D1 (4.10 g) | D4 (1.10 g) | D5 (38.8 g) |
| 11 | Polysiloxane solution (3) | D2 (4.07 g) | D3 (7.45 g), D4 (1.10 g) | D5 (32.5 g) |

Preparation of Liquid Crystal Aligning Agent

Preparation Example 12

To the polyimide powder (1) (1.50 g) obtained in Preparation Example 1, γ-BL (3.60 g) and PGME (32.4 g) were added, followed by stirring at 70° C. for 24 hours to dissolve the polyimide powder (1) to obtain a liquid crystal aligning agent (1). The liquid crystal aligning agent was confirmed to be a uniform solution without abnormality such as turbidity or precipitation.

Preparation Example 13

To the polyimide powder (1) (1.50 g) obtained in Preparation Example 1, γ-BL (3.60 g) and PGME (32.4 g) were added, followed by stirring at 70° C. for 24 hours to dissolve the polyimide powder (1). To the resulting solution, N1 (0.045 g), M1 (0.30 g) and K1 (0.15 g) were added, followed by stirring at 25° C. for 2 hours to obtain a liquid crystal aligning agent (2). The liquid crystal aligning agent was confirmed to be a uniform solution without abnormality such as turbidity or precipitation.

Preparation Example 14

To the polyimide powder (1) (1.55 g) obtained in Preparation Example 1, NMP (22.3 g), BCS (3.70 g) and PB (11.2 g) were added, followed by stirring at 70° C. for 24 hours to dissolve the polyimide powder (1). To the resulting solution, N1 (0.078 g), M2 (0.47 g) and K1 (0.078 g) were added, followed by stirring at 25° C. for 2 hours to obtain a liquid crystal aligning agent (3). The liquid crystal aligning agent was confirmed to be a uniform solution without abnormality such as turbidity or precipitation.

Preparation Example 15

To the polyamide acid solution (2) (7.50 g) obtained in Preparation Example 2, NEP (21.4 g), BCS (9.00 g) and PB (9.00 g) were added, followed by stirring at 50° C. for 24 hours for dissolution. To the resulting solution, N1 (0.056), M1 (0.28 g) and K1 (0.19 g) were added, followed by stirring at 25° C. for 2 hours to obtain a liquid crystal aligning agent (4). The liquid crystal aligning agent was confirmed to be a uniform solution without abnormality such as turbidity or precipitation.

Preparation Example 16

To the polyimide powder (3) (1.50 g) obtained in Preparation Example 3, γ-BL (1.80 g) and PGME (34.2 g) were added, followed by stirring at 70° C. for 24 hours to dissolve the polyimide powder (3). To the resulting solution, N1 (0.03 g), M1 (0.45 g) and K1 (0.11 g) were added, followed by stirring at 25° C. for 2 hours to obtain a liquid crystal aligning agent (5). The liquid crystal aligning agent was confirmed to be a uniform solution without abnormality such as turbidity or precipitation.

Preparation Example 17

To the polyimide powder (4) (1.60 g) obtained in Preparation Example 4, NEP (1.93 g), γ-BL (3.87 g) and PGME (32.6 g) were added, followed by stirring at 70° C. for 24 hours to dissolve the polyimide powder (4). To the resulting solution, N1 (0.016 g), M2 (0.16 g) and K1 (0.08 g) were added, followed by stirring at 25° C. for 2 hours to obtain a liquid crystal aligning agent (6). The liquid crystal aligning agent was confirmed to be a uniform solution without abnormality such as turbidity or precipitation.

Preparation Example 18

To the polyimide powder (5) (1.55 g) obtained in Preparation Example 5, γ-BL (3.70 g) and PGME (33.5 g) were added, followed by stirring at 70° C. for 24 hours to dissolve the polyimide powder (5). To the resulting solution, N1 (0.047 g), M1 (0.31 g) and K1 (0.16 g) were added, followed by stirring at 25° C. for 2 hours to obtain a liquid crystal aligning agent (7). The liquid crystal aligning agent was confirmed to be a uniform solution without abnormality such as turbidity or precipitation.

Preparation Example 19

To the polyimide powder (6) (1.50 g) obtained in Preparation Example 6, γ-BL (3.60 g) and PGME (32.4 g) were added, followed by stirring at 70° C. for 24 hours to dissolve the polyimide powder (6) to obtain a liquid crystal aligning agent (8). The liquid crystal aligning agent was confirmed to be a uniform solution without abnormality such as turbidity or precipitation.

Preparation Example 20

To the polyimide powder (7) (1.60 g) obtained in Preparation Example 7, γ-BL (3.80 g) and PGME (34.6 g) were added, followed by stirring at 50° C. for 24 hours to dissolve the polyimide powder (7). To the resulting solution, N1 (0.08 g), M2 (0.32 g) and K1 (0.08 g) were added, followed by stirring at 25° C. for 2 hours to obtain a liquid crystal aligning agent (9). The liquid crystal aligning agent was confirmed to be a uniform solution without abnormality such as turbidity or precipitation.

Preparation Example 21

To the polyimide powder (8) (1.50 g) obtained in Preparation Example 8, γ-BL (3.60 g) and PGME (32.4 g) were added, followed by stirring at 70° C. for 24 hours to dissolve the polyimide powder (8) to obtain a liquid crystal aligning agent (10). The liquid crystal aligning agent was confirmed to be a uniform solution without abnormality such as turbidity or precipitation.

Preparation Example 22

To the polysiloxane solution (1) (12.5 g) obtained in Preparation Example 9, BCS (1.80 g), PB (3.60 g) and PGME (19.6 g) were added, followed by stirring at 25° C. for 5 hours to obtain a liquid crystal aligning agent (11). The liquid crystal aligning agent was confirmed to be a uniform solution without abnormality such as turbidity or precipitation.

Preparation Example 23

To the polysiloxane solution (1) (12.5 g) obtained in Preparation Example 9, PB (3.60 g), PGME (21.4 g), N1 (0.075 g), M1 (0.15 g) and K1 (0.075 g) were added, followed by stirring at 25° C. for 5 hours to obtain a liquid crystal aligning agent (12). The liquid crystal aligning agent was confirmed to be a uniform solution without abnormality such as turbidity or precipitation.

Preparation Example 24

To the polysiloxane solution (1) (13.0 g) obtained in Preparation Example 9, BCS (11.2 g), PB (11.2 g), PGME (3.50 g), N1 (0.078 g), M1 (0.078 g) and K1 (0.016 g) were added, followed by stirring at 25° C. for 5 hours to obtain a liquid crystal aligning agent (13). The liquid crystal aligning agent was confirmed to be a uniform solution without abnormality such as turbidity or precipitation.

Preparation Example 25

To the polysiloxane solution (2) (13.0 g) obtained in Preparation Example 10, PB (1.90 g), PGME (24.1 g), N1 (0.047 g), M2 (0.047 g) and K1 (0.016 g) were added, followed by stirring at 25° C. for 5 hours to obtain a liquid crystal aligning agent (14). The liquid crystal aligning agent was confirmed to be a uniform solution without abnormality such as turbidity or precipitation.

Preparation Example 26

To the polysiloxane solution (3) (13.0 g) obtained in Preparation Example 11, BCS (1.90 g), PB (3.70 g) and PGME (20.4 g) were added, followed by stirring at 25° C. for 5 hours to obtain a liquid crystal aligning agent (15). The liquid crystal aligning agent was confirmed to be a uniform solution without abnormality such as turbidity or precipitation.

The liquid crystal aligning agents obtained in Preparation Examples 12 to 26 are shown in Tables 3 and 4.

In Tables 3 and 4, numerical values in brackets with respect to the specific generator, the specific adhesive compound and the specific crosslinkable compound, added to the liquid crystal aligning agent, represent their contents per 100 parts by mass of the specific polymer.

TABLE 3

| Preparation Example | Liquid crystal aligning agent | Specific polymer | Other polymer | Specific generator | Specific adhesive compound | Specific crosslinkable compound |
|---|---|---|---|---|---|---|
| 12 | (1) | Polyimide powder (1) | — | — | — | — |
| 13 | (2) | Polyimide powder (1) | — | N1(3) | M1(20) | K1(10) |
| 14 | (3) | Polyimide powder (1) | — | N1(5) | M2(30) | K1(5) |
| 15 | (4) | Polyamide acid solution (2) | — | N1(3) | M1(15) | K1(10) |
| 16 | (5) | Polyimide powder (3) | — | N1(2) | M1(30) | K1(7) |
| 17 | (6) | Polyimide powder (4) | — | N1(1) | M2(10) | K1(5) |
| 18 | (7) | Polyimide powder (5) | — | N1(3) | M1(20) | K1(10) |

TABLE 3-continued

| Preparation Example | Liquid crystal aligning agent | Specific polymer | Other polymer | Specific generator | Specific adhesive compound | Specific crosslinkable compound |
|---|---|---|---|---|---|---|
| 19 | (8) | Polyimide powder (6) | — | — | — | — |
| 20 | (9) | Polyimide powder (7) | — | N1(5) | M2(20) | K1(5) |
| 21 | (10) | — | Polyimide powder (8) | — | — | — |

TABLE 4

| Preparation Example | Liquid crystal aligning agent | Specific polymer | Other polymer | Specific generator | Specific adhesive compound | Specific crosslinkable compound |
|---|---|---|---|---|---|---|
| 22 | (11) | polysiloxane solution (1) | — | — | — | — |
| 23 | (12) | polysiloxane solution (1) | — | N1(5) | M1(10) | K1(5) |
| 24 | (13) | polysiloxane solution (1) | — | N1(5) | M1(5) | K1(1) |
| 25 | (14) | polysiloxane solution (2) | — | N1(3) | M2(3) | K1(1) |
| 26 | (15) | polysiloxane solution (3) | — | — | — | — |

[Preparation of Liquid Crystal Composition]

(Preparation of Liquid Crystal Composition (1))

Loctite 3736 (manufactured by Henkel Japan Ltd.) (a liquid comprising, based on the entire amount of the liquid, 38 mass % of an aliphatic urethane acrylate, 36 mass % of isobornyl acrylate, 9 mass % of an acrylate ester, 9 mass % of hydroxyethyl methacrylate, 5 mass % of a polymerization initiator and 3 mass % of an organic phosphoric acid compound) (0.75 g) and 1,9-nonanediol dimethacrylate (0.75 g) were mixed. The obtained mixture (1.50 g) and a liquid crystal (MLC-6608, manufactured by Merck Japan Limited) (2.79 g) were mixed to obtain a liquid crystal composition (1).

(Preparation of Liquid Crystal Composition (2))

A liquid crystal (MLC-6608, manufactured by Merck Japan Limited) (1.25 g), phenoxypolyethylene glycol acrylate (1.25 g), trimethylolpropane trimethacrylate (0.625 g) and a photosensitizing agent represented by the following formula [P1] (0.013 g) were mixed to obtain a liquid crystal composition (2).

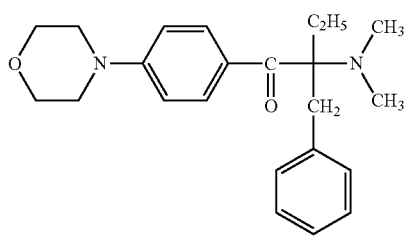

P1

[Preparation of Liquid Crystal Display Device and Evaluation of Liquid Crystal Alignment Property (Glass Substrate)]

The liquid crystal aligning agent obtained in each of Preparation Examples was subjected to filtration under pressure through a membrane filter having a pore size of 1 μm, and a liquid crystal display device was prepared. Specifically, the liquid crystal aligning agent was applied by spin coating on an ITO surface of a 100×100 mm ITO electrode-provided glass substrate (100 mm×100 mm×0.7 mm in thickness) washed with pure water and IPA (isopropyl alcohol), and subjected to a heat treatment on a hotplate at 100° C. for 5 minutes and in a circulating hot air clean oven at 210° C. for 30 minutes to obtain an ITO substrate provided with a vertical liquid crystal alignment film having a film thickness of 100 nm. Two such ITO substrates provided with a vertical liquid crystal alignment film were prepared, and spacers having a thickness of 6 μm were applied to the vertical liquid crystal alignment film of one of the substrates. Then, on the vertical liquid crystal alignment film to which the spacers were applied, the above liquid crystal composition (1) was dropped by an ODF method, and the other substrate was bonded so that the vertical liquid crystal alignment films faced each other to prepare a non-treated liquid crystal display device.

The non-treated liquid crystal display device was irradiated with ultraviolet rays using s specific ultraviolet irradiation apparatus employing the ultraviolet light-emitting diode shown in FIG. 2 as a light source (hereinafter sometimes referred to as a specific ultraviolet irradiation apparatus). Specifically, the wavelength of the light source of the ultraviolet light-emitting diode was 365 nm, the intensity of the ultraviolet rays was 15 mW/cm$^2$, the irradiation time was 60 seconds, and the temperature of the substrate surface was 20° C.

By the above procedure, a liquid crystal display device (reverse device) was obtained.

Using the liquid crystal display device, the liquid crystal alignment property was evaluated, by observing the device with a polarizing microscope (ECLIPSE E600WPOL, manufactured by NIKON CORPORATION) to confirm whether the liquid crystal was vertically aligned or not. Specifically, a device in which the liquid crystal was vertically aligned was evaluated as excellent (represented by "good" in Tables 5 and 6).

[Preparation of Liquid Crystal Display Device and Evaluation of Liquid Crystal Alignment Property (Plastic Substrate)]

The liquid crystal aligning agent obtained in each of Preparation Examples was subjected to filtration under pressure through a membrane filter having a pore size of 1 μm, and a liquid crystal display device was prepared. Specifically, the liquid crystal aligning agent was applied by a bar coater on an ITO surface of a 150×150 mm ITO electrode-provided PET (polyethylene terephthalate) substrate (150 mm×150 mm×0.2 mm in thickness) washed with pure water, and subjected to a heat treatment on a hotplate at 100° C. for 5 minutes and in a circulating hot air clean oven at 120° C. for 2 minutes to obtain an ITO substrate provided with a vertical liquid crystal alignment film having a film thickness of 100 nm. Two such ITO substrates provided with a vertical liquid crystal alignment film were prepared, and spacers having a thickness of 6 μm were applied to the vertical liquid crystal alignment film of one of the substrates. Then, on the vertical liquid crystal alignment film to which the spacers were applied, the above liquid crystal composition was dropped by an ODF method, and the other substrate was bonded so that the vertical liquid crystal alignment films faced each other to prepare a non-treated liquid crystal display device.

The non-treated liquid crystal display device was irradiated with ultraviolet rays using s specific ultraviolet irradiation apparatus employing the ultraviolet light-emitting diode shown in FIG. 2 as a light source. Specifically, the wavelength of the light source of the ultraviolet light-emitting diode was 365 nm, the intensity of the ultraviolet rays was 15 mW/cm$^2$, the irradiation time was 60 seconds, and the temperature of the substrate surface was 20° C.

Further, in some Examples, the non-treated liquid crystal display device was irradiated with ultraviolet rays using an ultraviolet irradiation apparatus employing a metal halide lamp as a light source (hereinafter sometimes referred to as a metal halide lamp-type ultraviolet irradiation apparatus). Specifically, the non-treated liquid crystal display device was irradiated with ultraviolet rays with an intensity of the ultraviolet rays of 30 mW/cm$^2$ via a cut filter which cut off wavelengths of at most 350 nm (irradiation time of 30 seconds). On that occasion, the temperature of the substrate surface was not controlled (a temperature increase to about 30° C. was confirmed).

By the above procedure, a liquid crystal display device (reverse device) was obtained.

Using the liquid crystal display device, the liquid crystal alignment property was evaluated, by observing the device with a polarizing microscope (ECLIPSE E600WPOL, manufactured by NIKON CORPORATION) to confirm whether the liquid crystal was vertically aligned or not. Specifically, a device in which the liquid crystal was vertically aligned was evaluated as excellent (represented by "good" in Tables 5 to 7).

[Evaluation of Optical Properties (Transparency and Scattering Property) (Glass Substrate)]

The transparency when no voltage was applied was evaluated by measuring the haze of the liquid crystal display device (glass substrate) in a state where no voltage was applied. Specifically, the haze was measured using a spectral haze meter (TC-1800H, manufactured by Tokyo Denshoku Co., Ltd.) as a measurement apparatus. A device with a lower haze was evaluated as excellent in the transparency (the haze is shown in Tables 5 and 6).

The scattering property when a voltage was applied was evaluated by applying an alternating voltage of 30 V to the liquid crystal display device (glass substrate) and measuring the haze under the same conditions as above. A device with a higher haze was evaluated as excellent in the scattering property (the haze shown in Tables 5 and 6).

[Evaluation of Optical Properties (Transparency and Scattering Property) (Plastic Substrate)]

The transparency when no voltage was applied was evaluated by measuring the haze of the liquid crystal display device (plastic substrate) in a state where no voltage was applied. Specifically, the haze was measured under the same conditions as above, and a device with a lower haze was evaluated as excellent in the transparency (the haze is shown in Tables 5 to 7).

The scattering property when a voltage was applied was evaluated by measuring the haze under the same conditions as above, and a device with a higher haze was evaluated as excellent in the scattering property (the haze is shown in Tables 5 to 7).

[Evaluation of Adhesion Between Liquid Crystal Layer and Vertical Liquid Crystal Alignment Film (Glass Substrate)]

The liquid crystal display device (glass substrate) was stored in a high temperature high humidity chamber at a temperature of 80° C. under a humidity of 90% RH for 120 hours, and presence or absence of bubbles in the liquid crystal display device (glass substrate) and separation of the device were confirmed. A device in which no bubbles were observed and separation of the device (separation of the liquid crystal layer and the vertical liquid crystal alignment film) did not occur was evaluated as excellent (represented by "good" in Tables 5 and 6).

[Evaluation of Adhesion Between Liquid Crystal Layer and Vertical Liquid Crystal Alignment Film (Plastic Substrate)]

The liquid crystal display device (plastic substrate) was stored in a high temperature high humidity chamber at a temperature of 80° C. under a humidity of 90% RH for 120 hours, and presence or absence of bubbles in the liquid crystal display device (plastic substrate) and separation of the device were confirmed. A device in which no bubbles were observed and separation of the device (separation of the liquid crystal layer and the vertical liquid crystal alignment film) did not occur was evaluated as excellent (represented by "good" in Tables 5 to 7).

Examples 1 to 18 and Comparative Examples 1 to 5

As shown in the following Tables 5, 6 and 7, using any of the liquid crystal aligning agents (1) to (15) obtained in the above Preparation Examples, and the above liquid crystal composition (1) or (2), and by using, as the ultraviolet irradiation apparatus, the specific ultraviolet irradiation apparatus or the metal halide-type ultraviolet irradiation apparatus, the liquid crystal display device was prepared, and the liquid crystal aligning property, the optical properties (transparency and scattering property) and the adhesion between the liquid crystal layer and the vertical liquid crystal alignment film were evaluated.

Examples 1 to 4, 7, 9 to 16 and 18 were carried out with the device using the plastic substrate, and Comparative Examples 1 to 5, and Examples 5, 6, 8 and 17 were carried out with the device using the glass substrate. The evaluation results are shown in Tables 5, 6 and 7.

With respect to the evaluation of the adhesion between the liquid crystal layer and the vertical liquid crystal alignment film in Examples 1, 3, 10, 11, 13, 15 and 18, in addition to the above standard test, as an emphasized test, the adhesion after storage in a high temperature high humidity chamber at a temperature of 80° C. under a humidity of 90% RH for 192 hours was also evaluated (the other conditions were the same as the above conditions). As a result, in Examples 3, 11 and 15, no bubbles were observed in the device, however, in Examples 1 and 13, bubbles were confirmed in a small amount in the device, and in Examples 10 and 18, bubbles were confirmed in a large amount in the device.

TABLE 5

| Ex. | Liquid crystal aligning agent | Liquid crystal composition | Ultraviolet irradiation apparatus | Liquid crystal alignment property | Optical properties (haze (%)) Transparency (no voltage applied) | Scattering property (voltage applied) | Adhesion between liquid crystal layer and vertical liquid crystal alignment film (standard test/ emphasized test) |
|---|---|---|---|---|---|---|---|
| 1 | (1) | (1) | Specific ultraviolet irradiation apparatus | Good | 13.1 | 90.0 | Good/*1 |
| 2 | (1) | (1) | Metal halide lamp-type ultraviolet irradiation apparatus | Good | 15.2 | 87.2 | Good/— |
| 3 | (2) | (1) | Specific ultraviolet irradiation apparatus | Good | 12.3 | 90.5 | Good/good |
| 4 | (2) | (1) | Metal halide lamp-type ultraviolet irradiation apparatus | Good | 14.7 | 88.0 | Good/— |
| 5 | (3) | (1) | Specific ultraviolet irradiation apparatus | Good | 11.7 | 89.7 | Good/— |
| 6 | (4) | (1) | Specific ultraviolet irradiation apparatus | Good | 12.4 | 89.4 | Good/— |
| 7 | (5) | (1) | Specific ultraviolet irradiation apparatus | Good | 14.2 | 86.8 | Good/— |
| 8 | (6) | (1) | Specific ultraviolet irradiation apparatus | Good | 11.5 | 90.0 | Good/— |
| 9 | (7) | (1) | Metal halide lamp-type ultraviolet irradiation apparatus | Good | 15.6 | 88.4 | Good/— |

TABLE 6

| Ex. | Liquid crystal aligning agent | Liquid crystal composition | Ultraviolet irradiation apparatus | Liquid crystal alignment property | Optical properties (haze (%)) Transparency (no voltage applied) | Scattering property (voltage applied) | Adhesion between liquid crystal layer and vertical liquid crystal alignment film (standard test/ emphasized test) |
|---|---|---|---|---|---|---|---|
| 10 | (8) | (1) | Specific ultraviolet irradiation apparatus | Good | 15.1 | 88.8 | Good/*2 |
| 11 | (9) | (1) | Specific ultraviolet irradiation apparatus | Good | 12.0 | 91.2 | Good/good |
| 12 | (9) | (1) | Metal halide lamp-type ultraviolet irradiation apparatus | Good | 14.2 | 88.8 | Good/— |
| 13 | (11) | (1) | Specific ultraviolet irradiation apparatus | Good | 12.7 | 90.1 | Good/*1 |
| 14 | (11) | (1) | Metal halide lamp-type ultraviolet irradiation apparatus | Good | 15.1 | 87.4 | Good/— |
| 15 | (12) | (1) | Specific ultraviolet irradiation apparatus | Good | 12.4 | 90.5 | Good/good |
| 16 | (13) | (1) | Specific ultraviolet irradiation apparatus | Good | 12.3 | 90.6 | Good/— |
| 17 | (14) | (1) | Specific ultraviolet irradiation apparatus | Good | 12.1 | 91.0 | Good/— |
| 18 | (15) | (1) | Specific ultraviolet irradiation apparatus | Good | 15.4 | 88.0 | Good/*2 |

TABLE 7

| Comp. Ex. | Liquid crystal aligning agent | Liquid crystal composition | Ultraviolet irradiation apparatus | Liquid crystal alignment property | Optical properties (haze (%)) Transparency (no voltage applied) | Optical properties (haze (%)) Scattering property (voltage applied) | Adhesion between liquid crystal layer and vertical liquid crystal alignment film (standard test/ emphasized test) |
|---|---|---|---|---|---|---|---|
| 1 | (10) | (1) | Specific ultraviolet irradiation apparatus | *3 | *3 | *3 | *3/— |
| 2 | (1) | (2) | Specific ultraviolet irradiation apparatus | Good | 19.4 | 83.0 | *1/— |
| 3 | (1) | (2) | Metal halide lamp-type ultraviolet irradiation apparatus | Good | 23.1 | 76.1 | *1/— |
| 4 | (11) | (2) | Specific ultraviolet irradiation apparatus | Good | 19.6 | 82.5 | *1/— |
| 5 | (11) | (2) | Metal halide lamp-type ultraviolet irradiation apparatus | Good | 23.6 | 75.4 | *1/— |

*1: Bubbles were observed in a small amount in the device.
*2: Bubbles were observed in a large amount in the device.
*3: The liquid crystal was not vertically aligned.

As evident from above, the liquid crystal display devices in Examples are liquid crystal display devices in which favorable optical properties, that is, favorable transparency when no voltage was applied and favorable scattering property when a voltage was applied were achieved, and the adhesion between the liquid crystal layer and the vertical liquid crystal alignment film was high, as compared with Comparative Examples.

Further, in Examples in which the liquid crystal composition (1) which is the liquid crystal composition in the present invention was used, favorable optical properties were achieved, that is, the haze when no voltage was applied was low, and the haze when a voltage was applied was high, as compared with Comparative Examples in which the liquid crystal composition (2) was used. Further, Examples are superior to Comparative Examples also in the adhesion between the liquid crystal layer and the vertical liquid crystal alignment film. Such are confirmed specifically by comparison between Example 1 and Comparative Example 2, between Example 2 and Comparative Example 3, between Example 13 and Comparative Example 4, and between Example 14 and Comparative Example 5, under the same conditions.

Further, in a case where the above formula [1-1] was employed among the specific side chain structures, optical properties of the liquid crystal display device, particularly the transparency when no voltage was applied, were more excellent as compared with the case of the formula [1-2]. Further, the adhesion between the liquid crystal layer and the vertical liquid crystal alignment film was also excellent. Such are confirmed specifically by comparison between Example 1 and Example 10 and between Example 13 and Example 18 under the same conditions (the adhesion between the liquid crystal layer and the vertical liquid crystal alignment film was compared by the emphasized test).

Further, it was confirmed that the adhesion between the liquid crystal layer and the vertical liquid crystal alignment film in the liquid crystal display device was further improved by incorporating the specific generator, the specific adhesive compound and the specific crosslinkable compound in the liquid crystal aligning agent, as compared with a case where they were not incorporated. Such are specifically confirmed by comparison between Example 1 and Example 3, and between Example 13 and Example 15, under the same conditions in the emphasized test.

In addition, in a case where the specific ultraviolet irradiation apparatus employing the ultraviolet light-emitting diode as a light source was used as the ultraviolet irradiation apparatus, favorable optical properties were obtained, that is, the haze was low when no voltage was applied and the haze was high when a voltage was applied, as compared with a case where the metal halide lamp-type ultraviolet irradiation apparatus employing a metal halide lamp as a light source was used. Such are confirmed specifically by comparison between Example 1 and Example 2, between Example 3 and Example 4, between Example 11 and Example 12 and between Example 13 and Example 14.

INDUSTRIAL APPLICABILITY

The liquid crystal display device of the present invention (present device) can be suitably used for e.g. a liquid crystal display used for display and further a light control window or an optical shutter device controlling transmission and blocking of light, and as the substrate of such a liquid crystal display device, a plastic substrate or film can be used.

The present device can be suitably used for a liquid crystal display device used for transport equipment or transport machinery such as automobiles, trains and aircraft, specifically, a light control window or an optical shutter device used for a room mirror, controlling transmission and blocking of light, etc. Particularly, since the present device provides favorable transparency when no voltage is applied and favorable scattering property when a voltage is applied, when the present device is used for a glass window of a vehicle, the light intake efficiency is high at night, and a higher anti-dazzling effect against external light will be achieved as compared with a conventional reverse device. Accordingly, the safety at the time of driving a vehicle and comfortability can be further improved. Further, in a case where the present device is prepared in a film form and bonded to a glass window of a vehicle, the reliability of the device tends to be high as compared with a conventional reverse device. That is, failure or deterioration due to low adhesion between the liquid crystal layer and the vertical liquid crystal alignment film is less likely to occur.

In addition, the present device may be used also as a light guide plate of a display device such as a LCD (liquid crystal display) or an OLED (organic light-emitting diode) display or a back board of a transparent display employing such a display. Specifically, in a case where the present device is used for a back board of a transparent display, for example, in a case where an image is to be displayed on a transparent display used in combination with the present device, the present device suppresses entrance of light from the rear side. On that occasion, the present device is in a scattering state with a voltage applied when an image is to be displayed on the transparent display, whereby the image can be clearly displayed, and after display of the screen is completed, the device is in a transparent state with no voltage applied.

The entire disclosure of Japanese Patent Application No. 2014-130409 filed on Jun. 25, 2014 including specification, claims, drawings and summary is incorporated herein by reference in its entirety.

REFERENCE SYMBOLS

2: light-emitting part, 3: power supply part, 4: sensor, 5: control device, 6, 7: flexible cord, 8: transmission line, 2a, 2b, light-emitting part, 3: power supply part, 4a, 4b, sensor, 5: control device, 8: transmission line, 9a, 9b: cable, 10a, 10b: cable.

The invention claimed is:

1. A reverse-type polymer dispersed liquid crystal (PDLC) or a polymer network liquid crystal (PNLC) display device, comprising:
a pair of substrates provided with an electrode; and
a liquid crystal layer formed by disposing a liquid crystal composition between the pair of substrates and irradiating the liquid crystal composition with ultraviolet rays by an ultraviolet irradiation apparatus when a part or the entire of the liquid crystal composition shows liquid crystallinity to cure the liquid crystal composition; and
a liquid crystal alignment film to vertically align a liquid crystal provided on at least one of the substrates,
the liquid crystal composition comprises a liquid crystal, a curable resin, a bifunctional monomer and a polar monomer having at least one polar group selected from the group consisting of a hydroxy group, a carboxy group and a phosphoric acid group, and
the liquid crystal alignment film is obtained from a liquid crystal aligning agent comprising a polymer having a structure of formula [1-1] or [1-2]:

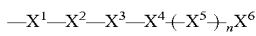 [1-1]

wherein $X^1$ and $X^3$ are each independently at least one binding group selected from the group consisting of a single bond, $-(CH_2)_a-$, wherein a is an integer of from 1 to 15, $-O-$, $-CH_2O-$, $-COO-$ and $-OCO-$;
$X^2$ is a single bond or $-(CH_2)_b-$, wherein b is an integer of from 1 to 15;
$X^4$ is at least one bivalent cyclic group selected from the group consisting of a benzene ring, a cyclohexane ring and a heterocyclic ring, or a $C_{17-51}$ bivalent organic group having a steroid skeleton, wherein a hydrogen atom on the cyclic group is optionally substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom;
$X^5$ is at least one cyclic group selected from the group consisting of a benzene ring, a cyclohexane ring and a heterocyclic ring, wherein a hydrogen atom on such a cyclic group is optionally substituted by a $C_{1-3}$ alkyl group, a $C_{1-3}$ alkoxy group, a $C_{1-3}$ fluorine-containing alkyl group, a $C_{1-3}$ fluorine-containing alkoxy group or a fluorine atom;

n is an integer of from 0 to 4; and
$X^6$ is at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group;

 [1-2]

wherein $X^7$ is at least one binding group selected from the group consisting of a single bond, $-O-$, $-CH_2O-$, $-CONH-$, $-NHCO-$, $-CON(CH_3)-$, $-N(CH_3)CO-$, $-COO-$ and $-OCO-$; and
$X^8$ is a $C_{8-22}$ alkyl group or a $C_{6-18}$ fluorine-containing alkyl group.

2. The liquid crystal display device of claim 1, wherein the liquid crystal has a phase transition temperature of from 40 to 120° C.,
a refractive index anisotropy (Δn) of from 0.150 to 0.350, and
a dielectric constant anisotropy (Δε) of from −1 to −10.

3. The liquid crystal display device of claim 1, wherein the curable resin comprises at least one compound selected from the group consisting of a monofunctional thiol compound, a multifunctional thiol compound and an oligomer thereof.

4. The liquid crystal display device of claim 1, wherein the curable resin comprises an aliphatic urethane acrylate, isobornyl acrylate, an acrylate ester, hydroxyethyl methacrylate and a polymerization initiator.

5. The liquid crystal display device of claim 1, wherein the polar monomer is an organic phosphoric acid compound.

6. The liquid crystal display device of claim 5, wherein a mixture of the curable resin and the organic phosphoric acid compound in the liquid crystal composition comprises from 30 to 40 mass % of the aliphatic urethane acrylate, from 30 to 40 mass % of isobornyl acrylate, from 1 to 10 mass % of the acrylate ester, from 1 to 10 mass % of hydroxyethyl methacrylate, from 1 to 10 mass % of the polymerization initiator and from 1 to 3 mass % of the organic phosphoric acid compound based on an entire amount of the mixture.

7. The liquid crystal display device of claim 6, wherein, in the liquid crystal composition, a mass ratio of the mixture to the bifunctional monomer is from 10:90 to 90:10.

8. The liquid crystal display device of claim 6, wherein, in the liquid crystal composition, a mass ratio of a mixture of the curable resin, the organic phosphoric acid compound and the bifunctional monomer to the liquid crystal is from 10:90 to 90:10.

9. The liquid crystal display device of claim 1, wherein the liquid crystal aligning agent comprises at least one polymer selected from the group consisting of an acrylic polymer, a methacrylic polymer, a novolac resin, a polyhydroxystyrene, a polyimide precursor, a polyimide, a polyamide, a polyester, a cellulose and a polysiloxane.

10. The liquid crystal display device of claim 1, wherein the liquid crystal aligning agent comprises a polyimide precursor obtained by reacting a diamine component comprising a diamine having a side chain structure of the formula [1-1] or [1-2] and a tetracarboxylic acid component, or a polyimide obtained by imidizing the polyimide precursor.

11. The liquid crystal display device of claim 10, wherein the diamine having a side chain structure of the formula [1-1] or [1-2] is a diamine of formula [1a]:

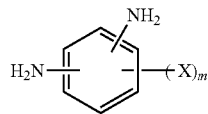
[1a]

wherein X is the structure of formula [1-1] or [1-2], and m is an integer of from 1 to 4.

12. The liquid crystal display device of claim 11, wherein the diamine is a diamine of formula [1a-1]:

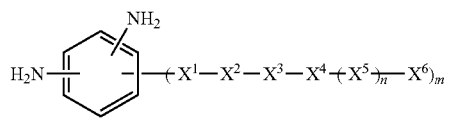
[1a-1]

wherein m is an integer of from 1 to 4.

13. The liquid crystal display device of claim 10, wherein the tetracarboxylic acid component is a tetracarboxylic acid dianhydride of formula [3]:

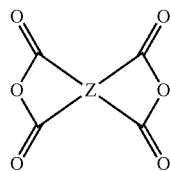
[3]

wherein Z is at least one structure selected from the group consisting of structures of formulae [3a] to [3k]:

[3a]
[3b]
[3c]
[3d]
[3e]
[3f]
[3g]
[3h]
[3i]
[3j]
[3k]

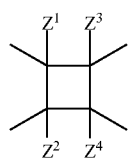
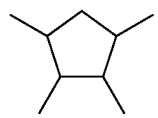
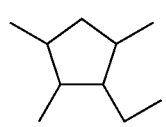
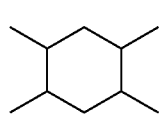
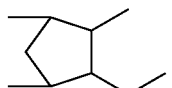
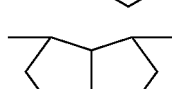
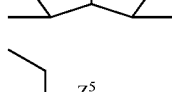
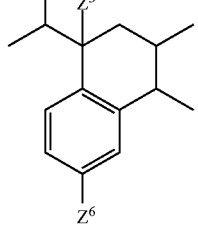
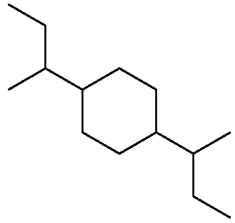
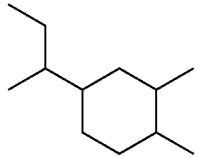
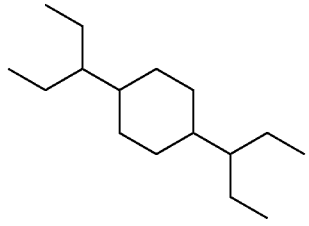

wherein $Z^1$ to $Z^4$ are each independently at least one member selected from the group consisting of a hydrogen atom, a methyl group, a chlorine atom and a benzene ring, and $Z^5$ and $Z^6$ are each independently a hydrogen atom or a methyl group.

14. The liquid crystal display device of claim 9, wherein the liquid crystal aligning agent comprises a polysiloxane obtained by polycondensing an alkoxysilane of formula [A1], or a polysiloxane obtained by polycondensing the alkoxysilane of formula [A1] and an alkoxysilane of formula [A2] or [A3]:

$$(A^1)_m Si(A^2)_n (OA^3)_p \quad [A1]$$

wherein A1 is the structure of the formula [1-1] or [1-2], $A^2$ is a hydrogen atom or a $C_{1-5}$ alkyl group, $A^3$ is a $C_{1-5}$ alkyl group,
m is an integer of 1 or 2,
n is an integer of from 0 to 2, and
p is an integer of from 0 to 3, wherein m+n+p is 4;

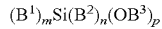 [A2]

wherein $B^1$ is a $C_{2-12}$ organic group having at least one member selected from the group consisting of a vinyl group, an epoxy group, an amino group, a mercapto group, an isocyanate group, a methacrylic group, an acrylic group, a ureido group and a cinnamoyl group,
$B^2$ is a hydrogen atom or a $C_{1-5}$ alkyl group,
$B^3$ is a $C_{1-5}$ alkyl group,
m is an integer of 1 or 2,
n is an integer of from 0 to 2, and
p is an integer of from 0 to 3, wherein m+n+p is 4;

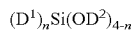 [A3]

wherein $D^1$ is a hydrogen atom or a $C_{1-5}$ alkyl group,
$D^2$ is a $C_{1-5}$ alkyl group, and
n is an integer of from 0 to 3.

15. The liquid crystal display device of claim 14, wherein $A^1$ in the formula [A1] is the structure of formula [1-1].

16. The liquid crystal display device of claim 1, wherein the liquid crystal aligning agent comprises at least one generator selected from the group consisting of a photo-radical generator, a photo-acid generator and a photo-base generator.

17. The liquid crystal display device of claim 1, wherein the liquid crystal aligning agent comprises a compound having at least one structure selected from the group consisting of structures of formulae [b-1] to [b-8]:

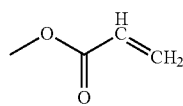 [b-1]

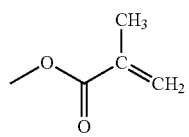 [b-2]

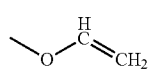 [b-3]

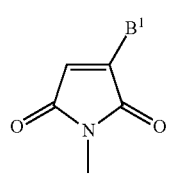 [b-4]

 [b-5]

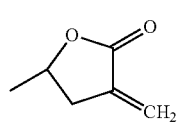 [b-6]

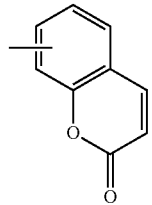 [b-7]

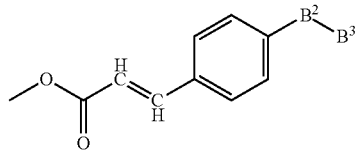 [b-8]

wherein $B^1$ is a hydrogen atom or a benzene ring,
$B^2$ is at least one cyclic group selected from the group consisting of a benzene ring, a cyclohexane ring and a heterocyclic ring, and
$B^3$ is at least one member selected from the group consisting of a $C_{1-18}$ alkyl group, a $C_{1-18}$ fluorine-containing alkyl group, a $C_{1-18}$ alkoxy group and a $C_{1-18}$ fluorine-containing alkoxy group.

18. The liquid crystal display device of claim 1, wherein the liquid crystal aligning agent comprises a compound having at least one group selected from the group consisting of an epoxy group, an isocyanate group, an oxetane group, a cyclocarbonate group, a hydroxy group, a hydroxyalkyl group and a lower alkoxyalkyl group.

19. The liquid crystal display device of claim 1, wherein the liquid crystal aligning agent comprises at least one solvent selected from the group consisting of 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone and solvents of formulae [D1] to [D3]:

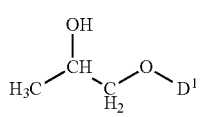 [D1]

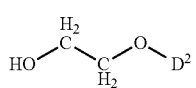 [D2]

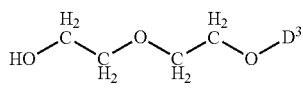 [D3]

wherein $D^1$ is a $C_{1-3}$ alkyl group,
$D^2$ is a $C_{1-3}$ alkyl group, and
$D^3$ is a $C_{1-4}$ alkyl group.

20. The liquid crystal display device of claim 1, wherein the liquid crystal aligning agent comprises at least one solvent selected from the group consisting of N-methyl-2-pyrrolidone, N-ethyl-2-pyrrolidone and γ-butyrolactone.

21. The liquid crystal display device of claim 1, wherein the ultraviolet irradiation apparatus controls an intensity and a wavelength of ultraviolet rays applied, and a surface temperature of the pair of substrates, and the irradiating is performed while controlling the intensity and the wavelength of ultraviolet rays applied and the surface temperature of the pair of substrates.

22. The liquid crystal display device of claim 21, wherein the ultraviolet irradiation apparatus comprises an ultraviolet light-emitting diode as a light source.

23. The liquid crystal display device of claim 1, wherein the substrate is a glass substrate or a plastic substrate.

24. The liquid crystal display device of claim 1, wherein the curable resin is included in the liquid crystal composition in an amount of from 24.7 to 100 parts by mass per 100 parts by mass of the liquid crystal.

25. The liquid crystal display device of claim 1, wherein the liquid crystal has a negative dielectric anisotropy.

26. The liquid crystal display device of claim 1, wherein liquid crystal display device has a haze value of 15.6 or less when a voltage is not applied to the electrode, and a haze value of 87.2 or greater when a voltage is applied to the electrode.

* * * * *